United States Patent [19]

Ushida et al.

[11] Patent Number: 5,717,793
[45] Date of Patent: Feb. 10, 1998

[54] HIGH QUALITY IMAGE SIZE CHANGE

[75] Inventors: Katsutoshi Ushida, Machida; Yuichi Bannai, Koganei; Kunihiro Yamamoto, Machida, all of Japan

[73] Assignee: Canon Kabushiki Kaisha, Tokyo, Japan

[21] Appl. No.: 376,450

[22] Filed: Jan. 23, 1995

Related U.S. Application Data

[63] Continuation of Ser. No. 847,762, Mar. 4, 1992, abandoned.

[30] Foreign Application Priority Data

Mar. 18, 1991 [JP] Japan ................................ 3-052210
Mar. 18, 1991 [JP] Japan ................................ 3-522211

[51] Int. Cl.$^6$ .......................................................... G06K 9/32
[52] U.S. Cl. ........................... 382/298; 382/266; 358/451
[58] Field of Search ................................... 382/47, 54, 55, 382/44, 298, 299, 300, 301, 264, 266, 269, 258; 358/447, 448, 451, 452

[56] References Cited

U.S. PATENT DOCUMENTS

| 4,771,471 | 9/1988 | Kitamura ................................ 382/47 |
| 5,138,672 | 8/1992 | Hirabayashi et al. ................ 382/47 |

FOREIGN PATENT DOCUMENTS

| 264059 | 4/1988 | European Pat. Off. ........ G06F 15/62 |
| 392701 | 10/1990 | European Pat. Off. ......... H04N 1/41 |

OTHER PUBLICATIONS

Ulichney et al., "Scaling Binary Images With The Telescoping Template", IEEE Transactions on Pattern Analysis and Machine Intelligence, vol. PAMI-4, No. 3, pp. 331-335 (1982).

*Primary Examiner*—Leo Boudreau
*Assistant Examiner*—Phuoc Tran
*Attorney, Agent, or Firm*—Fitzpatrick, Cella, Harper & Scinto

[57] ABSTRACT

When enlargement processing is performed, binary image data inputted from a data line 100 is subjected to contour smoothing by a contour smoothing and enlarging circuit 2 and the data is enlarged by a factor of n (where n is an integer) in the main scanning direction and m (where m is an integer) in the subordinate scanning direction. When reduction processing is performed, the binary image data is outputted as is from a selector 6 to a multivalue-converting circuit 3 via a signal line 200. In the multivalue-converting circuit 3, the binary image is stored temporarily in a memory, the image data of any area is extracted, image data of multivalued density is calculated based upon a window outputted from a weighting table with reference to an area comprising a pixel of interest and its peripheral pixels, and the multivalued data is outputted to a variable-power circuit 4 via a signal line 300. In the variable-power circuit 4, the multivalued-density image data is zoomed down to any size by thinning-out processing based on an image clock and line synchronizing signal, and the resulting data is outputted to a binarizing circuit 5 via a signal line 400. The binarizing circuit 5 converts the image data of multivalued density into binary data and outputs this data on a data line 500.

7 Claims, 31 Drawing Sheets

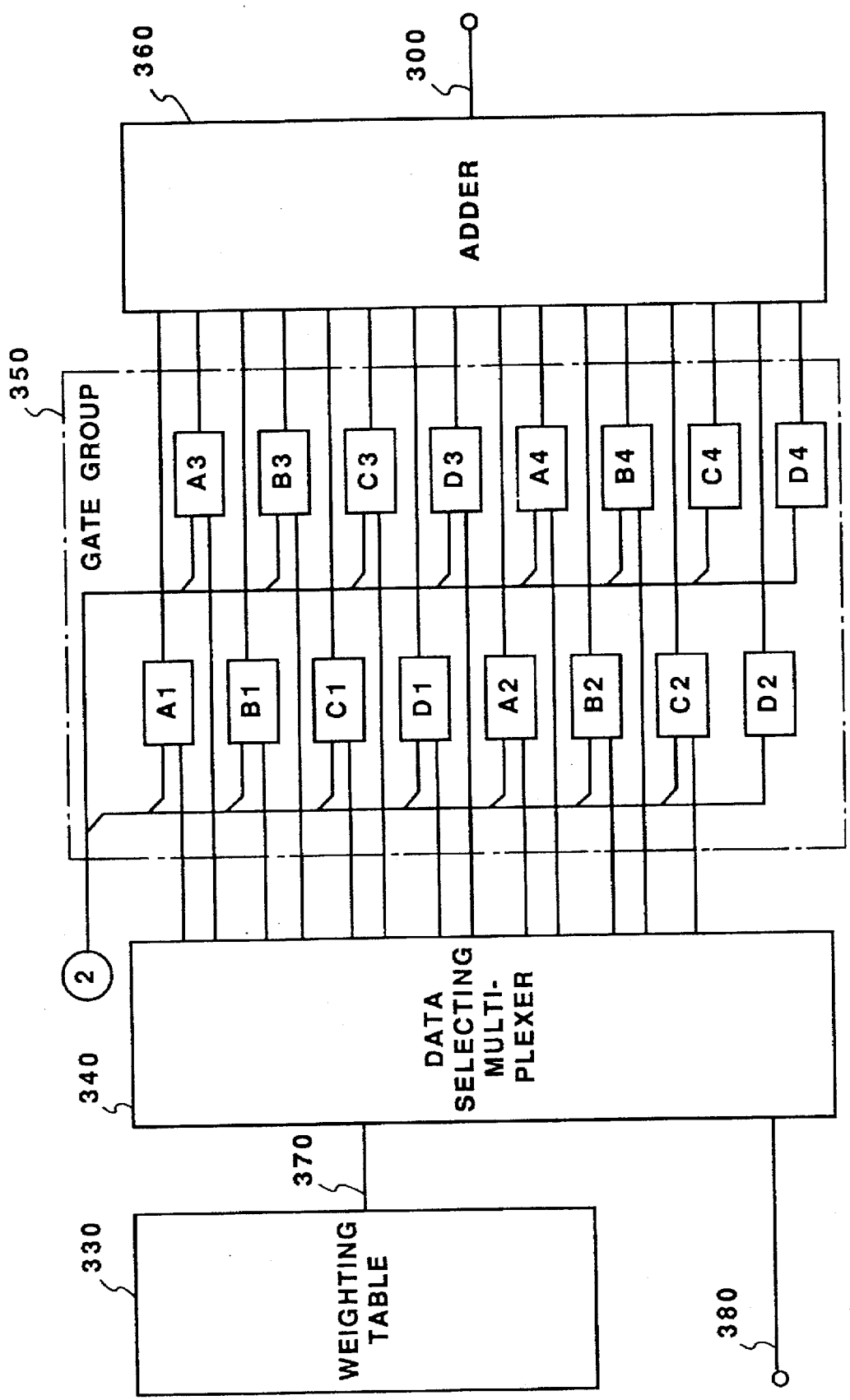
F I G. 14

| A1 (i-2,j-2) | A2 (i-1,j-2) | A3 (i,j-2) | A4 (i+1,j-2) |
|---|---|---|---|
| B1 (i-2,j-1) | B2 (i-1,j-1) | B3 (i,j-1) | B4 (i+1,j-1) |
| C1 (i-2,j) | C2 (i-1,j) | C3 (i,j) | C4 (i+1,j) |
| D1 (i-2,j+1) | D2 (i-1,j+1) | D3 (i,j+1) | D4 (i+1,j+1) |

| j-2<br>i-2 | j-2<br>i-1 | j-2<br>i | j-2<br>i+1 |
|---|---|---|---|
| j-1<br>i-2 | j-1<br>i-1 | j-1<br>i | j-1<br>i+1 |
| j<br>i-2 | j<br>i-1 | j<br>i | j<br>i+1 |
| j+1<br>i-2 | j+1<br>i-1 | j+1<br>i | j+1<br>i+1 |

(b)

| 0 | 0 | 0 | 0 |
|---|---|---|---|
| 0 | 1 | 2 | 1 |
| 0 | 2 | 4 | 2 |
| 0 | 1 | 2 | 1 |

(c)

| 0 | 0 | 0 | 0 |
|---|---|---|---|
| 0 | 1 | 1 | 1 |
| 0 | 1 | 1 | 1 |
| 0 | 1 | 1 | 1 |

(d)

| 0 | 0 | 0 | 0 |
|---|---|---|---|
| 0 | 0 | 2 | 0 |
| 0 | 2 | 8 | 2 |
| 0 | 0 | 2 | 0 |

(e)

| 0 | 0 | 0 | 0 |
|---|---|---|---|
| 0 | 4 | 2 | 4 |
| 0 | 2 | 1 | 2 |
| 0 | 4 | 2 | 4 |

(f)

| 1 | 1 | 1 | 1 |
|---|---|---|---|
| 1 | 1 | 1 | 1 |
| 1 | 1 | 1 | 1 |
| 1 | 1 | 1 | 1 |

FIG. 16

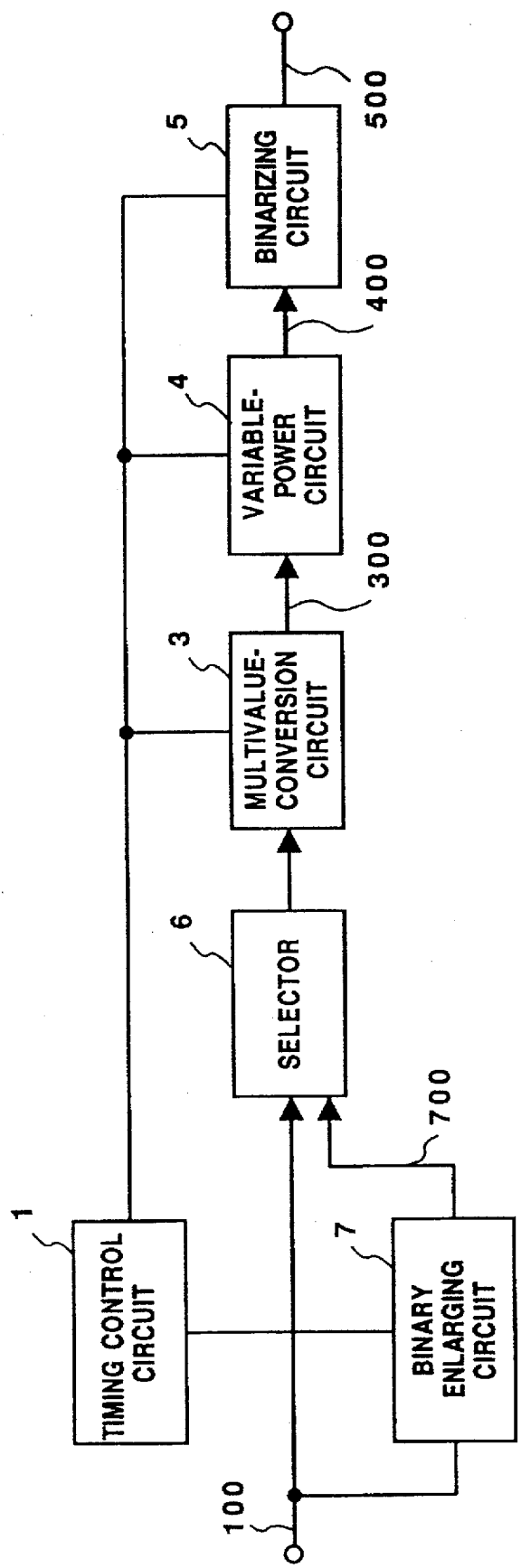
F I G. 28

HIGH QUALITY IMAGE SIZE CHANGE

This application is a continuation of application Ser. No. 07/847,762, filed Mar. 4, 1992, now abandoned.

BACKGROUND OF THE INVENTION

1. Field of the Invention

This invention relates to an image processing method and apparatus. More particularly, the invention relates to an image processing method and apparatus for executing zoom processing which changes binary image data to any magnification and outputting binary image data having a different pixel density.

2. Description of the Prior Art

The selected pixel coding method, logical product method, projection method and segmentation-by-nine method are known as methods of converting the pixel density of a binary image expressed by black-and-white binary data. These methods of converting pixel density are for application to characters and line drawings. In a facsimile or word processor, the construction of the apparatus is simple, and therefore pixel-density conversion processing, based upon simple thinning-out of pixels and overlay processing and typified by the SPC method, is carried out.

Further, a technique for obtaining a moiré pattern-free image of changed magnification (a zoomed image) by zooming based upon simple thinning-out and overlay processing every matrix has been provided as a pixel-density converting method for application to a textured dither image.

In the prior art mentioned above, a comparatively good image can be obtained for characters and line drawings in a case where use is made of simple thinning-out and overlay processing on every pixel in turn. However, when the above-mentioned processing is applied to a pseudo-half-tone image in which density is expressed by the density of black pixels in a fixed area, the pattern of the black pixels is disturbed, a disturbance in tonality occurs and moiré patterns are produced. For example, when simple thinning-out and overlay processing for every pixel is applied to a pseudo-half-tone image obtained by the error-diffusion method, tonality is disturbed, and a noisy image is obtained. Similarly, when this processing is applied to a dither image, the period interferes, and the moiré pattern is produced, owing to the period of the dither matrix and the thinning-out and overlay processing.

On the other hand, in thinning-out and overlay processing in which a dither matrix serves as the unit, the dither image expresses density in dither-matrix units, and therefore it is possible to obtain a comparatively good zoomed image in which tonality is preserved. However, the conversion magnification is limited, and images capable of being handled are limited to pseudo-half-tone images based upon the dither method.

Another drawback is that the difference in level of diagonal lines becomes conspicuous with regard to the characters or line drawings in an enlarged image.

SUMMARY OF THE INVENTION

An object of the present invention is to provide an image processing method and apparatus in which it becomes possible to carry out various kinds of processing, which are used conventionally in multivalued images, by converting a binarized image into density data, wherein an image of changed magnification (a zoomed image) which excels in preservation of density is obtained through similar processing even with regard to an image in which character images and pseudo-half-tone images are mixed.

Another object of the present invention is to provide an image processing method and apparatus for performing contour smoothing and enlarging processing which decides individual density values following enlargement from the density values of a pixel of interest and pixels peripheral thereto at the time of enlargement, wherein a difference in level of diagonal portions in characters and line drawings can be smoothed by interpolation.

A further object of the present invention is to provide an image processing method and apparatus in which the blurring of edge portions of a character image, which tends to occur when a multivalued conversion is made, can be prevented by varying a window when making a conversion from a binary value to multivalued density, and in which the occurrence of moiré patterns and pseudo-contours in pseudo-half-tone images is suppressed at the same time, whereby a high-quality image that has undergone a pixel-density conversion can be obtained.

According to the present invention, the foregoing objects are attained by providing an image processing apparatus to which binary image data comprising x pixels in a main scanning direction and y pixels in a subordinate scanning direction is inputted, converted into any size of X pixels in the main scanning direction and Y pixels in the subordinate scanning direction, and outputted as binary image data, comprising contour smoothing and enlarging means for enlarging the image size of the inputted binary image data by a factor of any integral number, namely a factor of m in the main scanning direction and n in the subordinate scanning direction in the form of binary data, and applying contour smoothing processing by deciding the density values of a group of plural pixels pertaining to a pixel of interest prior to enlargement based upon the densities of peripheral pixels to the pixel of interest, binary-to-multivalued density converting means for calculating multivalued density, from the density of the pixel of interest and the densities of its peripheral pixels of binary image data, enlarged by a factor of an integral number, obtained by the contour smoothing and enlarging means at the time of enlargement processing, and of the inputted binary image data at the time of reduction processing, arbitrary magnification changing means for reducing, at arbitrary magnifications in the main and subordinate scanning directions, the size of image data of multivalued density obtained by the binary-to-multivalued density converting means, and binarizing means for binarizing the image data of multivalued density obtained by the arbitrary magnification changing means.

As a result, any original image, such as a character image or pseudo-half-tone image, can be changed in magnification with high quality. With regard to a pseudo-half-tone image, an original image inputted as binary data is converted into density data and changed in magnification, whereby an image which excels in preservation of density can be obtained. In addition, with regard to character images and line drawings, window size is changed in dependence upon the ratio of the change in magnification, thereby making it possible to prevent the blurring of edges, which tends to occur at the time of a multivalued conversion. By performing contour smoothing and enlarging at the time of enlargement, it is possible to obtain an image that has undergone a pixel-density conversion, in which a difference in the level of diagonal portions is smoothly interpolated.

Other features and advantages of the present invention will be apparent from the following description taken in

BRIEF DESCRIPTION OF THE DRAWINGS

FIGS. 13 and 14 are block diagrams showing the construction of a multivalue-converting circuit depicted in FIG. 2;

FIG. 15 is a diagram for describing the relationship between 4×4 image data and coordinates;

FIG. 16 is a diagram showing the weighting rates of a window for a multivalued conversion;

FIG. 28 is a block diagram showing the construction of a pixel density converting apparatus in the second embodiment;

DESCRIPTION OF THE PREFERRED EMBODIMENTS

Preferred embodiments of the present invention will now be described in detail with reference to the drawings.

<Description of processing (zoom processing) for changing magnification (FIG. 1)>

The flow of processing for changing magnification according to this embodiment will be described in detail with reference to FIG. 1.

Figure 1:
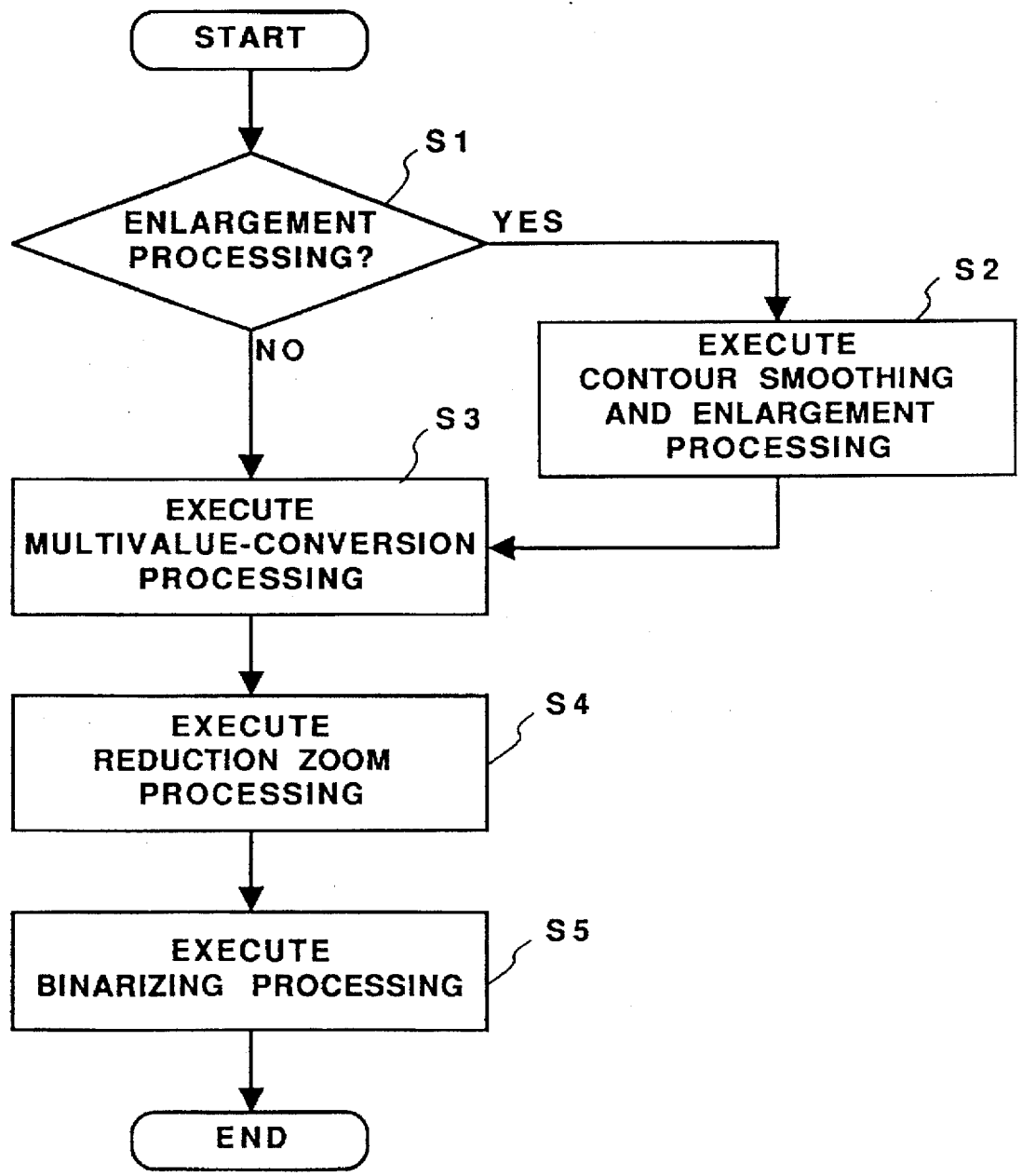
FIG. 1 is a flowchart showing zoom processing in a first embodiment of the invention.

FIG. 1 is a flowchart illustrating the processing for applying a change in magnification so that binary data of x pixels in the main scanning direction and y pixels in the subordinate scanning direction is changed to binary data of X pixels in the main scanning direction and Y pixels in the subordinate scanning direction. At step S1 of the flowchart, it is determined whether enlargement processing is to be applied (in either the main or subordinate scanning direction). If enlargement processing is not applied, i.e., if reduction processing is to be applied, the program proceeds to step S3. In the case of enlargement processing, the program proceeds to step S2.

(1) Enlargement processing

If enlargement processing is to be applied, processing for smoothing and enlarging contour is executed at step S2. According to this processing, the binary digital data of x pixels in the main scanning direction and y pixels in the subordinate scanning direction is converted, by pixel-density conversion processing that accompanies the contour smoothing and enlarging processing, into binary data of (n×xmy) pixels by changing the magnification by a factor of n in the main scanning direction (n=[X/x], where [a] represents the smallest integer not smaller than a) and m in the subordinate scanning direction (m=[Y/y], where Y>y). Next, at step S3, the binary data obtained at step S2 is scanned pixel by pixel using a window conforming to the ratio of the change in magnification, multivalued-density data is calculated from the pixel pattern of the binary image within the window, and this data is converted into image data of multivalued density of (nx×my) pixels. This is followed by step S4, at which the image data of multivalued density of the (nx×ny) pixel size obtained by the conversion at step S3 is subjected to thinning-out processing by a clock and line synchronizing signal, the data is zoomed down to any size and is converted into image data of multivalued density of (X×Y) pixels. Next, at step S5, the image data of multivalued density of (X×Y) pixels is subjected to binarizing processing, whereby (X×Y)-pixel binary image data of changed magnification is obtained.

(2) Reduction processing

In the case of reduction processing, step S1 is followed directly by step S3, where the (x×y) pixel binary data is scanned pixel by pixel using a window conforming to the ratio of the change in magnification, multivalued-density data is calculated from the pixel pattern of the binary image within the window, and this data is converted into image data of multivalued density of (x×y) pixels. This is followed by step S4, at which the image data of multivalued density of the (x×y) pixel size obtained by the conversion at step S3 is subjected to thinning-out processing by a clock and line synchronizing signal, the data is zoomed down to any size and is converted into image data of multivalued density of (X×Y)-pixels. Next, at step S5, the image data of multivalued density of (X×Y) pixels is subjected to binarizing processing, whereby (X×Y) pixel binary image data of changed magnification is obtained.

In the flow described above, window scanning is performed in which the referential pixels differ depending upon the ratio of magnification when the binary image is converted into the multivalued-density image data. At the time of enlargement processing, the binary image is converted into the multivalued-density image data once the enlargement processing has been applied to the data in binary form. As a result, it is possible to obtain a zoomed image in which blurring of edge portions of the image, which occurs at the time of the conversion from being to multivalued data, is suppressed to the maximum degree. In addition, by executing the contour smoothing and enlarging processing at the time of enlargement, differences in the level of diagonal lines, which occur when repeated enlarging is performed, can be smoothly interpolated so that it is possible to obtain a high-quality character image.

<Description of circuit arrangement (FIG. 2)>

Figure 2:
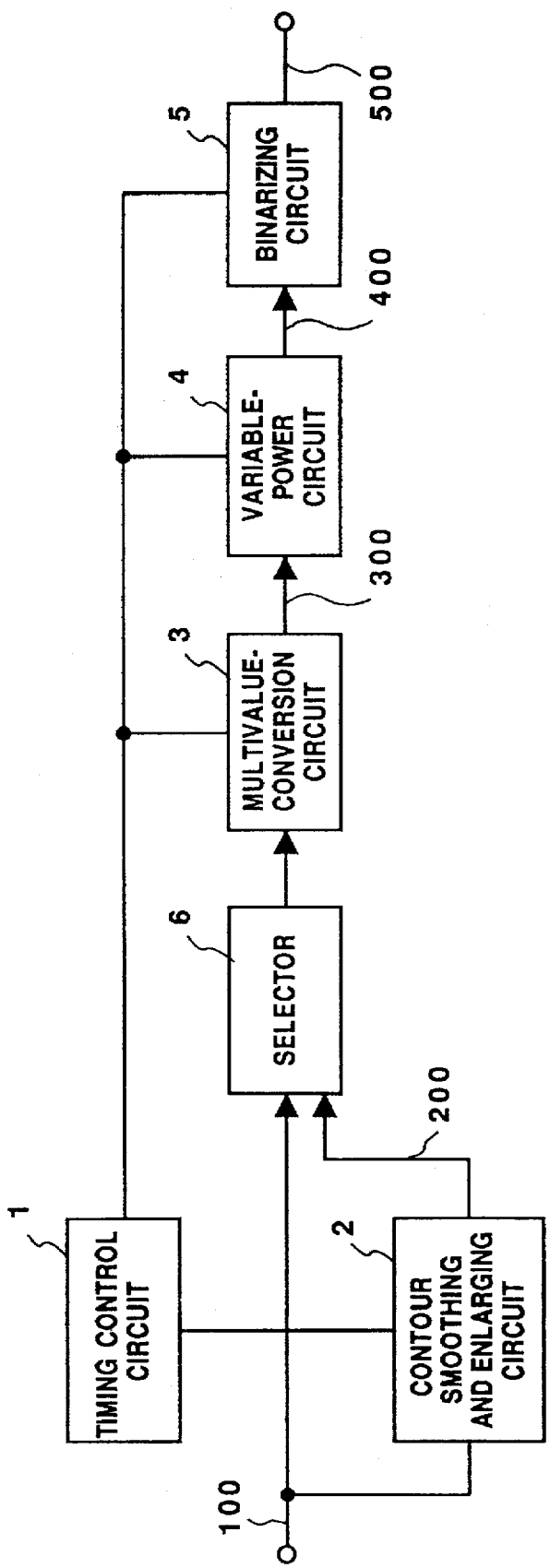
FIG. 2 is a block diagram showing the construction of a pixel density converting apparatus in the first embodiment.

FIG. 2 is a block diagram showing the construction of an apparatus for converting pixel density according to this embodiment. The circuit elements will now be described in sequence.

In FIG. 2, numeral 100 denotes a data line for inputting data to the apparatus. Specifically, black-and-white binary digital data expressed by one bit per pixel (in which "1" represents black and "0" represents white) enters the apparatus on data line 100. In the case where enlargement processing is executed, the binary data inputted from line 100 is enlarged by a factor of n (an integer) in the main scanning direction and m (an integer) in the subordinate scanning direction by contour smoothing and enlargement in a contour smoothing and enlarging circuit 2. The resulting binary data, in which differences in the level of diagonal-line portions are smoothly interpolated by the aforementioned processing, is outputted from a selector 6 to a multivalue-converting circuit 3 (both of which will be described later) via a signal line 200. In the case where a reduction in magnification is carried out, the binary data inputted from the signal line 100 is inputted as is from the selector 6 to the multivalue-converting circuit 3. The selector 6 selects the binary data inputted from signal line 200 at the time of enlargement processing and the binary data inputted from signal line 100 at the time of reduction processing. The selected data is fed in both cases into the multivalue-converting circuit 3.

In the multivalue-converting circuit 3, the data is temporarily stored in a memory (not shown), and image data in any desired region is extracted. While reference is made to the region which comprises a pixel of interest and its peripheral pixels, multivalued-density image data (e.g., "0"~"63" in the case of a six-bit output, wherein "0" and "63" represent white and black, respectively) is calculated based upon a window outputted from a weighting table, and the multivalued data is outputted to a variable-power circuit 4 via a signal line 300. Next, the variable-power circuit 4 performs zooming to reduce the multivalued-density image data, which has been outputted by the multivalue-converting circuit 3, to any desired size by the thinning-out processing of an image clock and line synchronizing signal. The resulting image data is outputted to a binarizing circuit 5 via a signal line 400. The binarizing circuit 5 converts the multivalued data outputted by the variable-power circuit 4 into binary data and outputs the binary data on a data line 500.

The details of construction of the pixel-density converting apparatus having the foregoing configuration will be set forth with reference to the related diagrams.

<Description of contour smoothing and enlarging circuit (FIGS. 3~12)>

Figure 3:
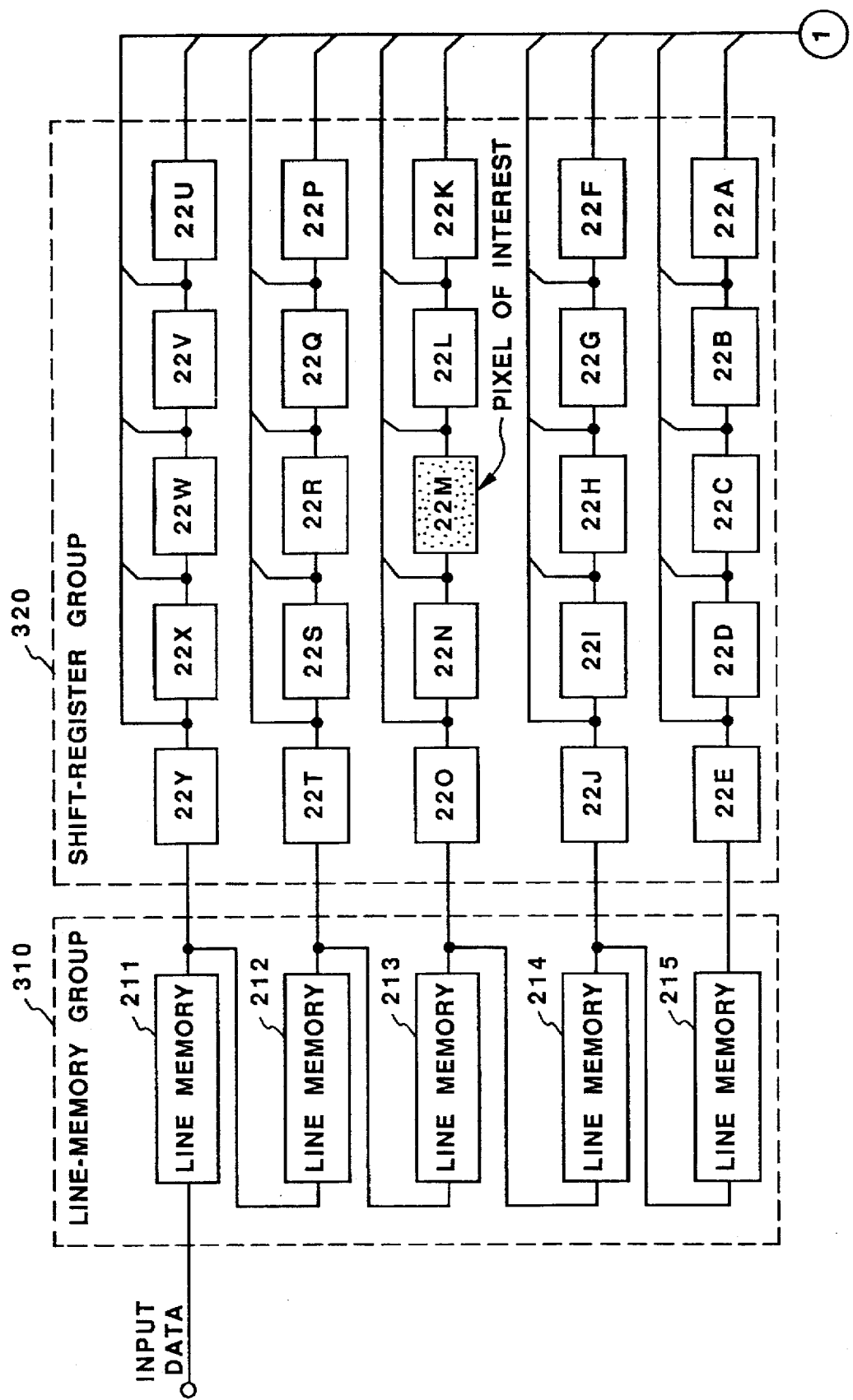
FIGS. 3 and 4 are block diagrams showing the construction of a contour smoothing and enlarging circuit depicted in FIG. 2.
Figure 4:
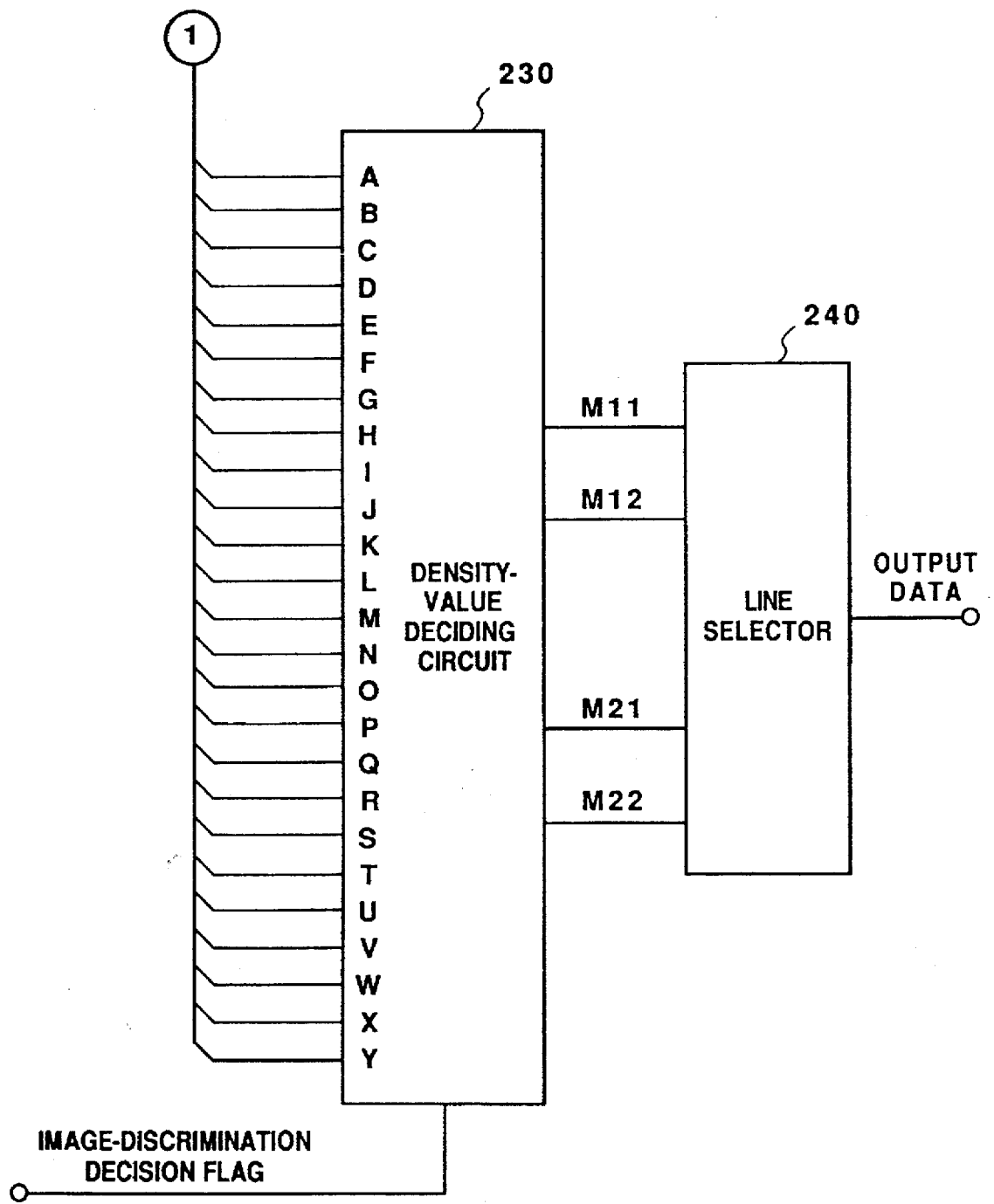

FIGS. 3 and 4 are diagrams showing the specific construction of the contour smoothing and enlarging circuit depicted in FIG. 2. In this embodiment, a case will be described in which data is enlarged by a factor of two (doubled) in the main and subordinate scanning directions. It should be noted that enlargement by essentially arbitrary integer factors of n in the main scanning direction and m in the subordinate scanning direction also is possible by combining a plurality of these circuits. In addition, to raise resolution by subdivision, and to enlarge, are taken to have the same meaning.

In this circuit, subdivision is performed when inputted binary image data is outputted, and the densities of pixels obtained by subdividing the pixel of interest are decided in dependence upon the pattern of the peripheral pixels, whereby the contour smoothing of diagonal lines is performed with regard to character images and line drawings. Image clocks CLK1, CLK2 and line synchronizing signals DB1, DB2, where are inputted to the circuit, enter from a timing control circuit 1, described later. In a case where the image clock CLK1 and line synchronizing signal DB1 are subjected to enlarging processing by a factor of n in the main scanning direction and m in the subordinate scanning direction, the result of frequency-dividing the image clock CLK2, following multiple processing, by n and the result of frequency-dividing the line synchronizing signal DB2 by m, are selectively inputted by a selector 120 (FIG. 17) of the timing control circuit 1.

Shown in FIGS. 3 and 4 are line memories 211–215 for holding inputted binary image data, shift registers 22A–22Y, a density-value deciding circuit 230 for deciding individual pixel densities, after the execution of subdivision processing, from inputted matrix data, and a line selector 240 for extracting the individual pixel data, which is inputted in parallel from the density-value deciding circuit 230, upon synchronizing of this data to the image clock CLK2 line by line. The operation of this circuit will now be described in detail with reference to the drawings.

First, one line of binary image data in the main scanning direction is read in the line memory 211 of the line memory group, and this data is shifted, in line units, in the subordinate scanning direction in the following manner: line memory 212→213→214→215. The image data from the line memories 211–215 is read out in synchronization with CLK1 outputted by the timing control circuit 1 so that five pixels of parallel data in the subordinate scanning direction are shifted to respective ones of the shift registers 22Y, 22T, 22O, 22J, 22E. The five pixels of image data in the subordinate direction thus shifted in are shifted successively through the shift registers in synchronization with CLK1. Here matrix data of 5 lines×5 pixels is extracted from the shift registers 22A–22Y, and this data is inputted to the density-value deciding circuit 230.

Figure 5:
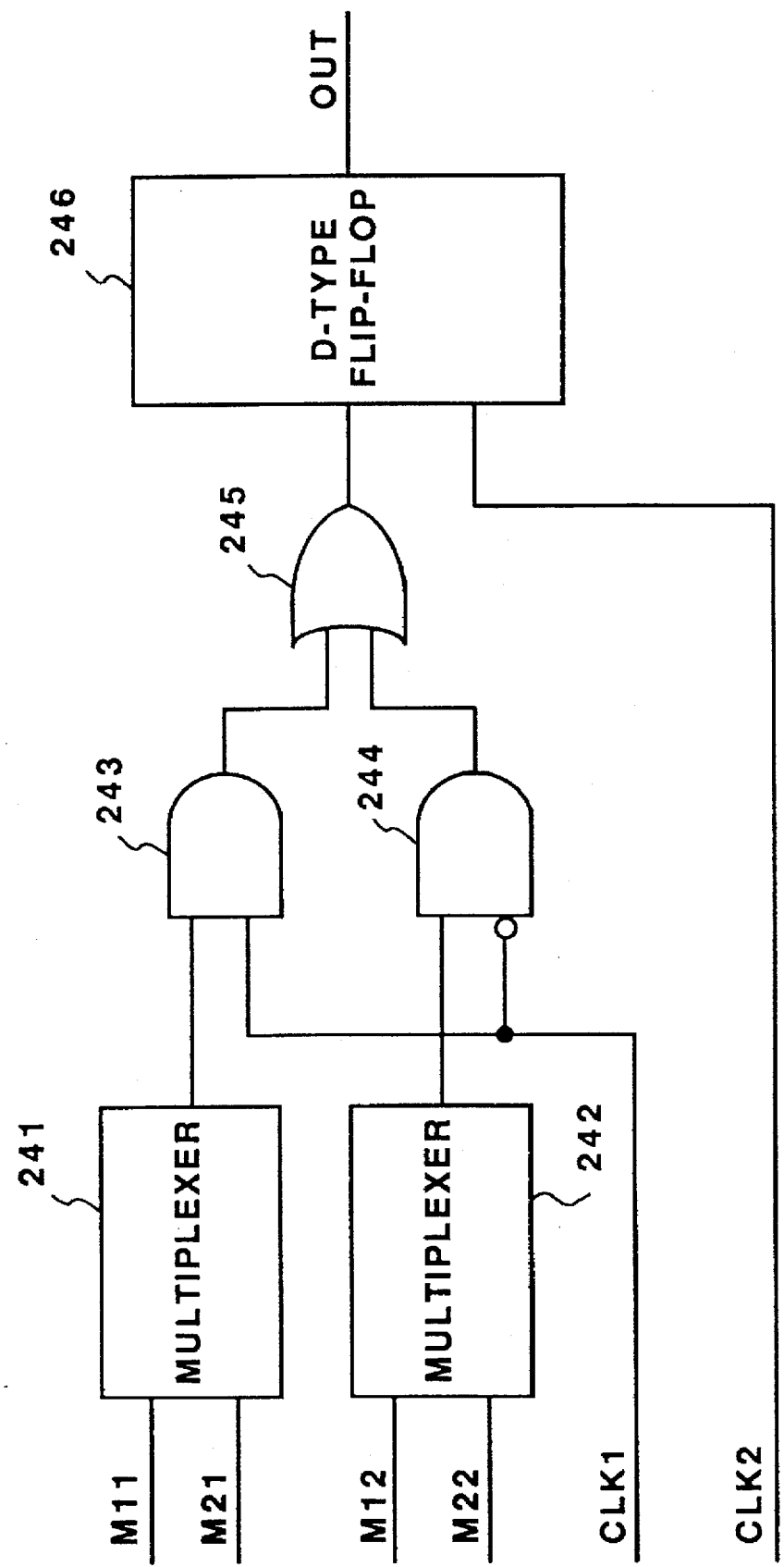
FIG. 5 is a diagram showing the construction of a density-value deciding circuit depicted in FIG. 4.
Figure 6:
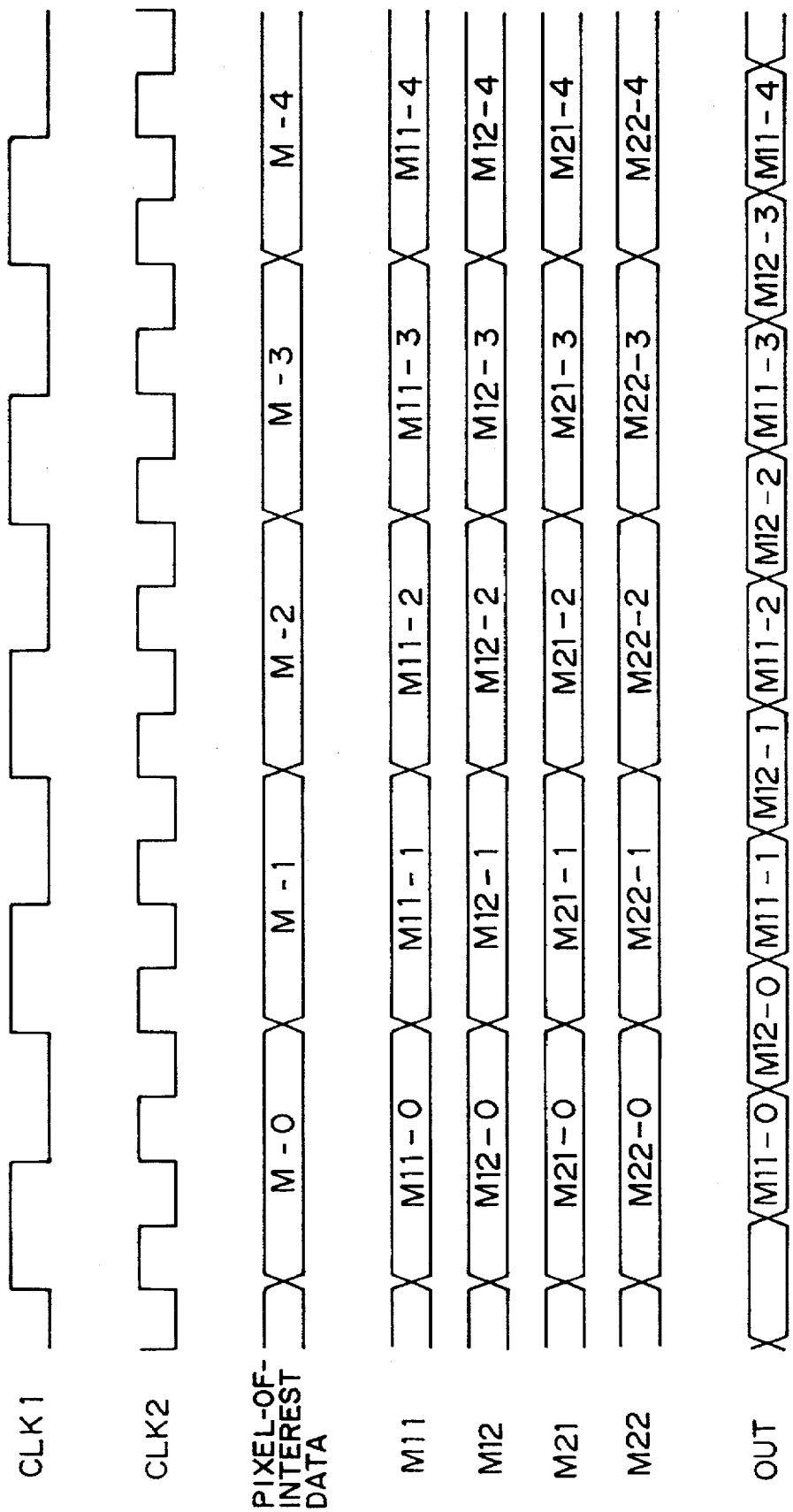
FIG. 6 is a timing chart showing the operation of the contour smoothing and enlarging circuit.

The density-value deciding circuit 230 outputs pixel data M11–M22, which is obtained by subdividing or breaking up a pixel of interest (the data in shift register 22M in this example), which is located at the center of the 5×5 array, into four parts and performing interpolation processing. The outputted data enters the line selector 240 in parallel fashion. The line selector 240 selects the image data of the output line and outputs the subdivided image data in synchronization with the output image clock CLK2. FIGS. 5 and 6 illustrate the details of the line selector 240.

In FIG. 5, the interpolated pixel data M11, M12, M21, M22 from the density-value deciding circuit 230 enters multiplexers 241, 242 in synchronization with the image clock CLK1 of the pixel prior to subdivision. The pixel data (M11, M12 in this example) of the outputted line is selected by multiplexers 241, 242, and the selected pixel data enters AND gates 243, 244. The pixel data (e.g., M11, M12) whose density has been doubled in the main scanning direction is successively selected in accordance with CLK1 by a selector constructed by the AND gates 243, 244 and an OR gate 245. The selected pixel data is finally delivered to a D-type flip-flop 246 which, in synchronization with the pixel clock CLK2, outputs subdivided image data of the kind shown at OUT in FIG. 5.

Whenever one line of image data is read in the line memory 221 in synchronization with DB1, the multiplexers 241, 242 are changed over sequentially in synchronization with DB2 to extract two lines of subdivided pixel data, whereby image data subdivided by a factor of two in the subordinate scanning direction can be obtained.

In the density-value deciding circuit 230, a flag is inputted from image discriminating means. The latter is for determining whether the pixel of interest is a character or line-drawing area or whether it is a pseudo-half-tone area. In the case of a pseudo-half tone, the arrangement is such that the input data from the shift register 22M, which is that of the pixel of interest, is outputted as is to M11 through M22. Thus, if it is determined that the pixel of interest is that of a pseudo-half-tone image, the foregoing processing makes it possible to output the subdivided-pixel data without interpolating it. As a result, the deleterious side-effects of contour smoothing and enlargement on pseudo-half tones can be prevented.

Furthermore, by repeating similar processing using the output of the density-value deciding circuit 230 as new matrix data, it is possible to obtain a high-density converted image whose density has been multiplied four-fold in the main and subordinate directions or eight-fold in the main and subordinate directions, etc.

Figure 7:
FIG. 7 is a diagram illustrating the correspondence between referential pixels and subdivided pixels in contour smoothing and enlargement.
Figure 8:
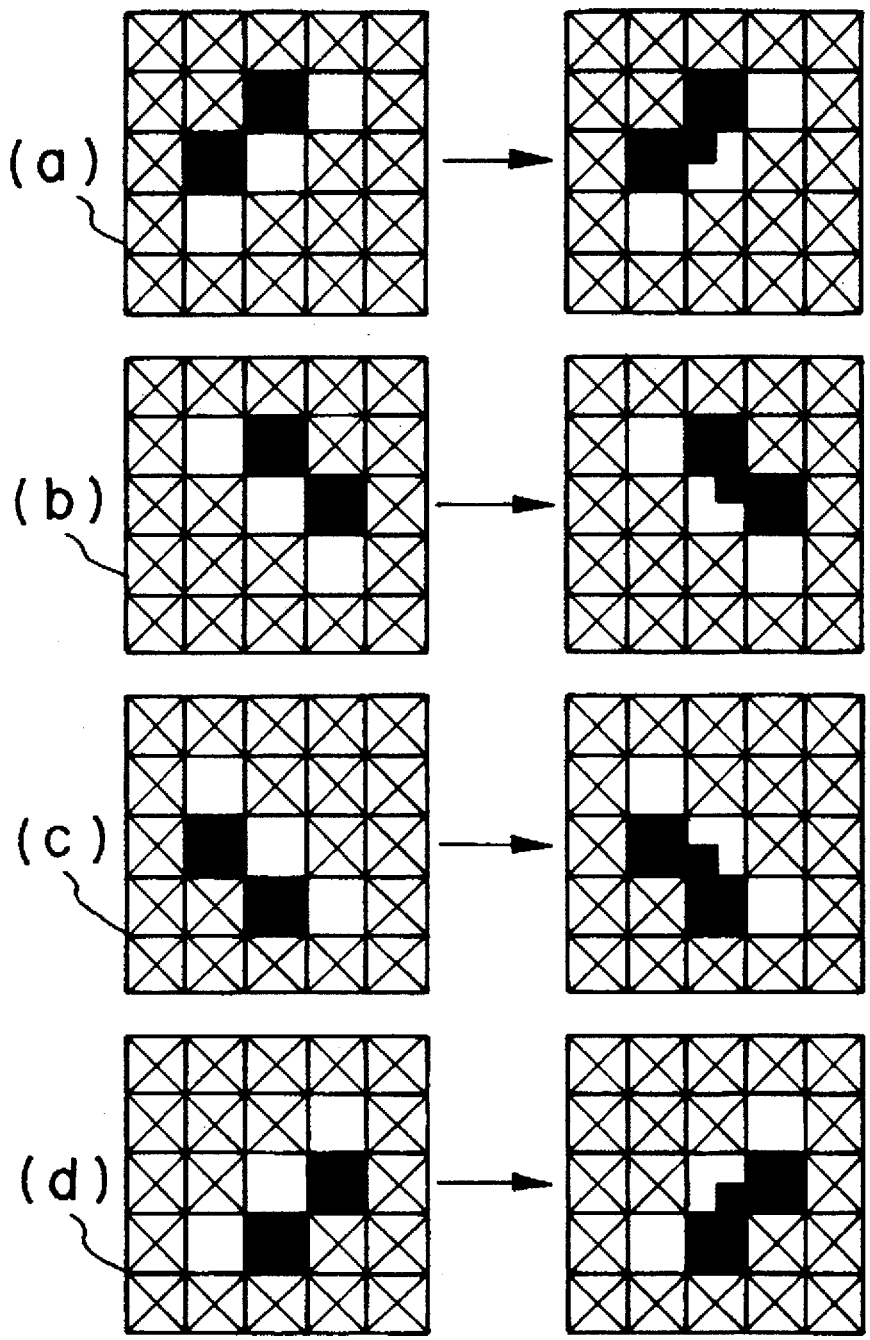
FIGS. 8, 9 and 10 are diagrams showing patterns for deciding the density values of subdivided pixels from 5×5 peripheral-pixel density values.
Figure 9:
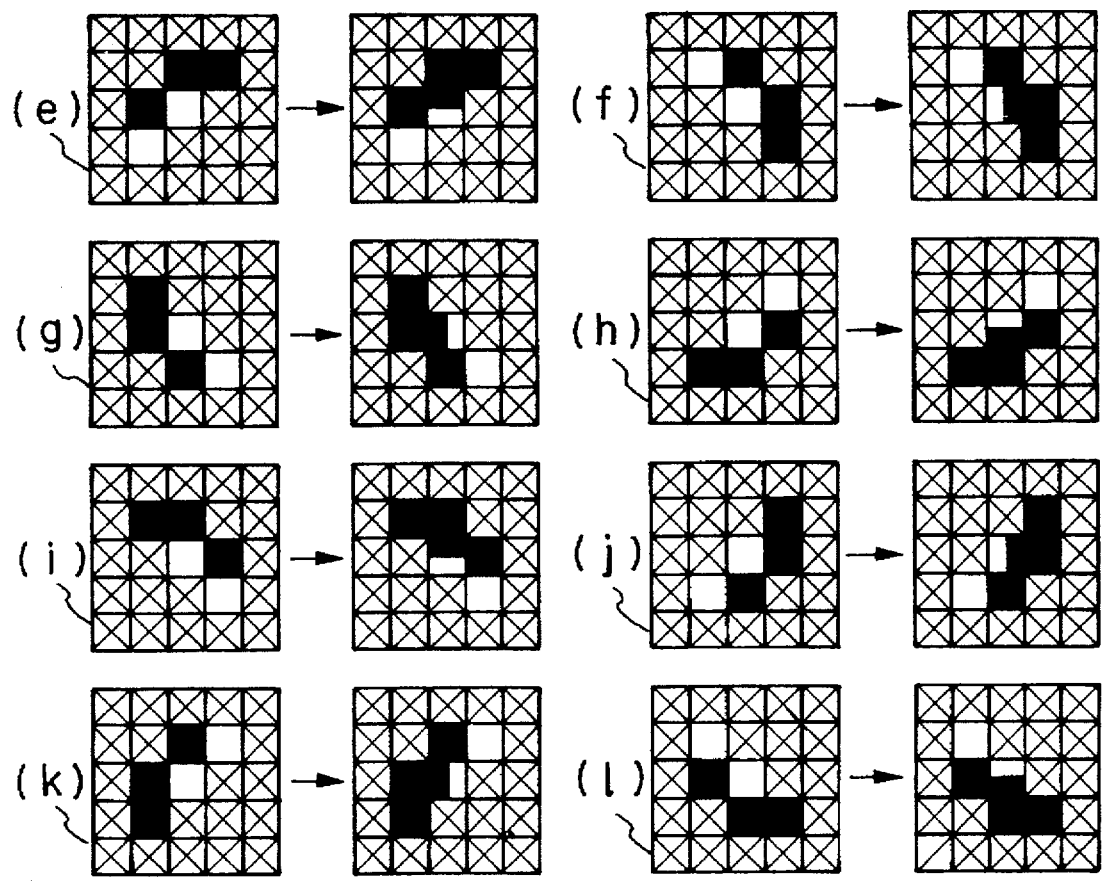
Figure 10:
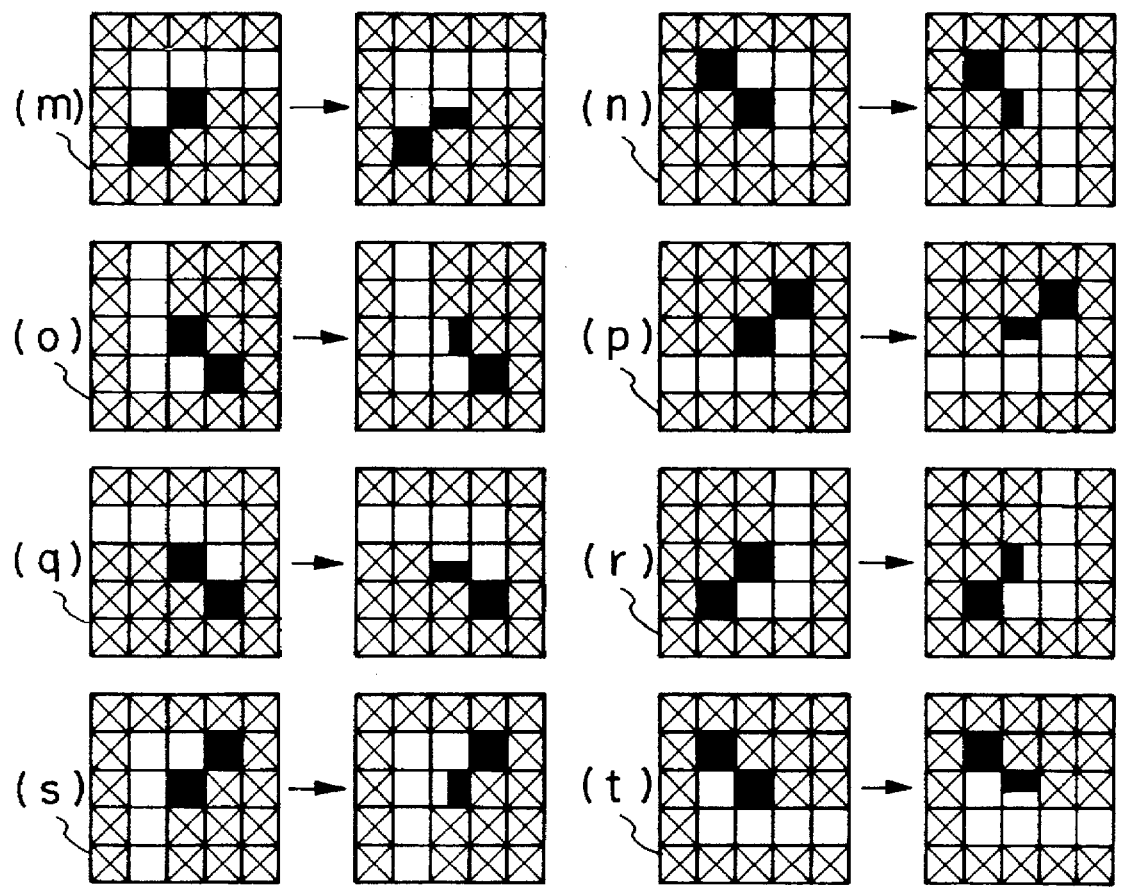

Next, the relationship between the matrix data inputted to the density-value deciding circuit 230 and the outputted subdivided image data will be described in detail. FIG. 7 is a diagram showing referential pixels and subdivided pixels according to this embodiment. In FIG. 7, M represents the pixel of interest, A through Y (except M) represent referential pixels, and M11 through M22 represent subdivided pixels. FIGS. 8, 9 and 10 illustrate patterns for deciding the density values of the individual subdivided pixels versus the density values of the referential pixels.

In FIGS. 8 through 10, no reference is made to the pixels crossed out. In the patterns which decide the density values, the referential pixels determine whether the pixel of interest is part of a diagonal line, a portion which indicates a right angle, or some other portion. In FIGS. 8 and 9, (a) through (l) illustrate patterns for performing interpolation processing in a case where the pixel of interest is a white pixel. In case of (a), the referential pixels H and L in FIG. 7 are black and the referential pixels I and Q are white, wherein it is judged that the pixel of interest is part of a black diagonal line whose inclination is tanθ=1. The density of M11 is reversed from white to black. Similarly, in case of (b) through (d), the pattern (a) is rotated successively 90° each time from symmetry. In case of (e), the referential pixels H, I and L in FIG. 7 are black and the referential pixel Q is white, wherein it is judged that the pixel of interest is part of a black diagonal line whose inclination is tanθ=½. The densities of the two pixels M11 and M12 are reversed from white to black. In case of (f) through (h), the pattern (e) is rotated successively 90° each time from symmetry. In (i) through (l), the pattern (e) is flipped over and then rotated successively 90° each time. On the other hand, (m) through (t) illustrate patterns for performing interpolation processing in a case where the pixel of interest is a black pixel. In case of (m), the referential pixels G, H, I, J and L in FIG. 7 are white and the referential pixel Q is white, wherein it is judged that the pixel of interest is part of a white diagonal line whose inclination is tanθ=⅓. The densities of the two pixels M11 and M12 are reversed from black to white. Similarly, in case of (n) through (p), the pattern is rotated successively 90° each time from symmetry. In case of (q) through (t), the pattern is flipped over and then rotated successively 90° each time.

The individual actions of the interpolation processing in each pattern will now be described.

(1) Detection of right angles

In case of a pattern other than those described above, density is not reversed and the density of each subdivided pixel is made a density identical with that of the original image. As a result, when the pixel of interest is white and the referential pixels H, I, L, Q are black, for example, it is determined that a right-angle portion is present, interpolation processing is not executed and the right-angle portion is reproduced clearly.

(2) Detection of inclination of diagonal lines

In a case where the pixel of interest is a white pattern, as in patterns (a) through (l), the number of subdivided pixels reversed in density from white to black in patterns (a) through (d) differs from that in patterns (e) through (l). By thus detecting the inclination of a diagonal line and changing the number of pixels which undergo a reversal in density depending upon a difference in inclination, an image whose contours are smoothed more effectively with regard to steeply inclined diagonal lines and gently inclined diagonal lines can be obtained. Similarly, in a case where the pixel of interest is a black pattern, as in patterns (m) through (t), two pixels undergo a density reversal from black to white so that more effective contour smoothing can be applied to steep diagonal lines and gently diagonal lines.

(3) Preventing the cancellation of the interpolating effect in slanted lines having inclinations of tanθ=1, ½, 2

The inclination of the diagonal-line detection pattern which undergoes density reversal in a situation where the pixel of interest is a white pattern as in (a) through (l) differs from that in a situation where the pixel of interest is a black pattern as in (m) through (t). When a pattern in which white and black are reversed with respect to individual pixels in the patterns (a) through (l) is used in a situation where the pixel of interest is a white pattern, the interpolation processing is cancelled out with regard to diagonal lines tanθ=1, ½, 2. As a result, the steps of the diagonal lines are merely shifted and the effect of interpolation is lost. Consequently, by changing the angle of diagonal-line detection (performing processing with respect to tanθ=⅓ when the pixel of interest is black) between the case where the pixel of interest is a white pattern (a) through (l) and a case where the pixel of interest is a black pattern (m) through (t), it is possible to apply effective contour smoothing to diagonal lines tanθ=1, ½, 2 as well.

(4) Preventing missing black diagonal lines owing to a fine diagonal-line judgment In a case where the pixel of interest is a black pattern, as in patterns (m) through (t), reference is made to G, I, Q, S shown in FIG. 7. However, when the pixel of interest is a white pattern, as in patterns (a) through (l), no reference is made to G, I, Q, S. In other words, contour smoothing is applied effectively to black diagonal lines composed of connected individual dots, and no interpolation processing is applied to white diagonal lines composed of connected individual dots. As a result, it is possible to prevent missing connections in fine, black diagonal lines, which is a side effect of the contour smoothing of white diagonal lines.

A circuit in which the above-described patterns are formed by logic circuitry is the density deciding circuit 230. This circuit is constructed as a logical operation unit for pixel density conversion. An example of another method is to use a ROM in which the outputs of the registers A through Y are adopted as 25-bit address inputs and the densities of M11 through M22 have been written in as data.

Figure 11:
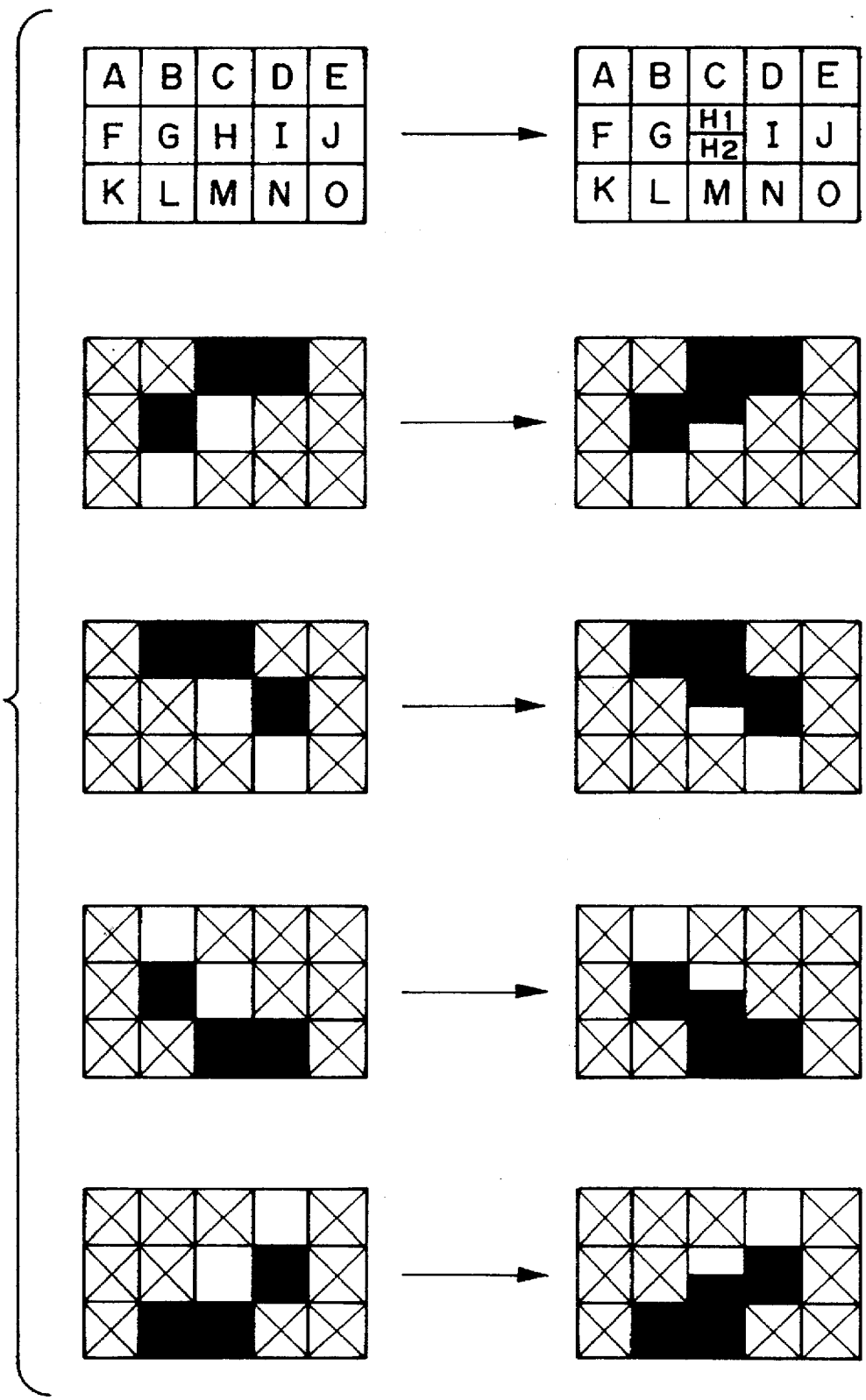
FIGS. 11 and 12 are diagrams showing patterns for deciding the density values of subdivided pixels from 5×3 peripheral-pixel density values.
Figure 12:
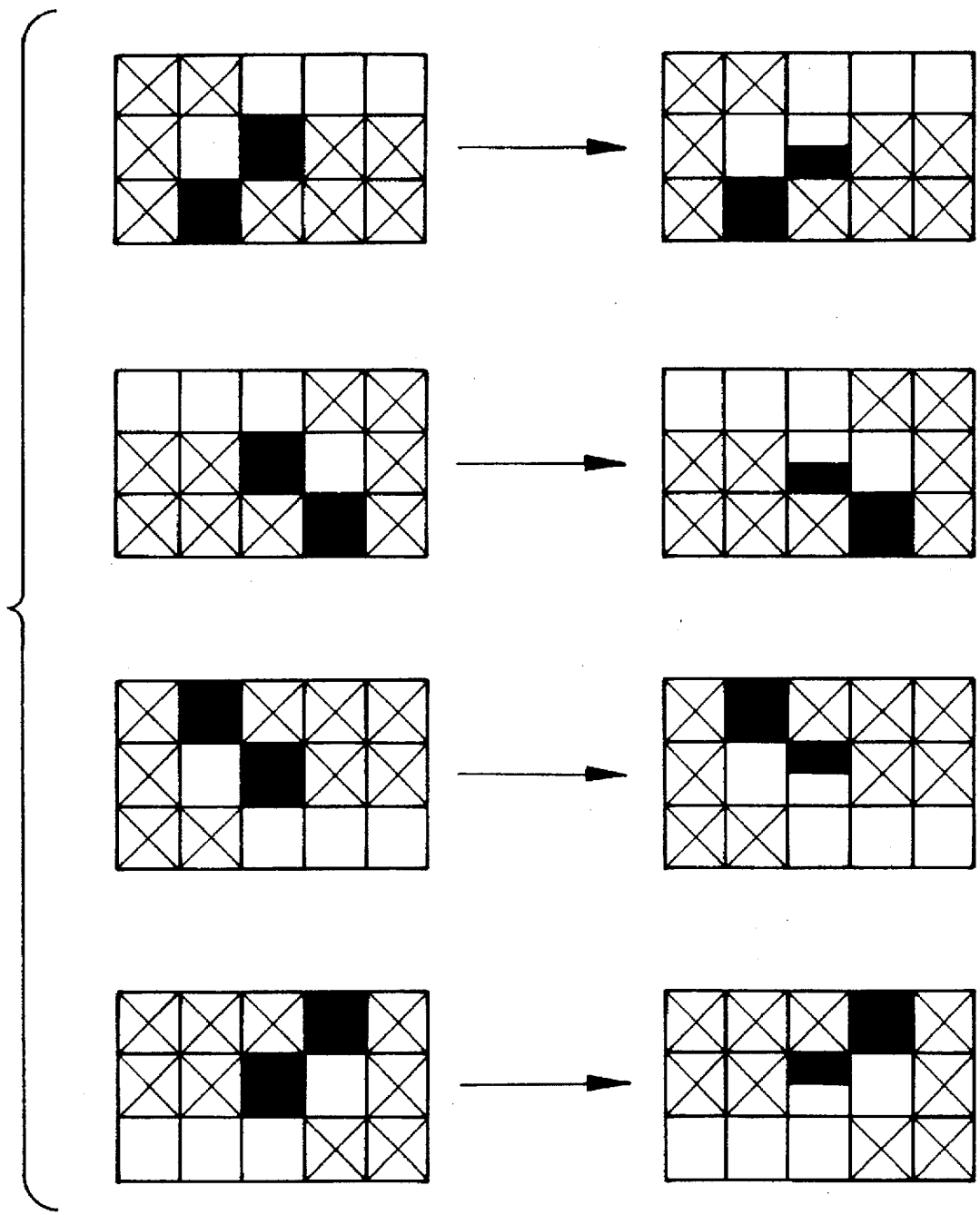

Though a case has been described in which doubling is performed in both the main and subordinate scanning directions, processing is executed in the same manner also when doubling in the subordinate scanning direction or in the main scanning direction. FIGS. 11 and 12 are patterns showing the relationship among the pixel of interest, the peripheral pixels and pixels obtained by subdividing the pixel of interest in a case where enlargement is performed by a factor of two in the subordinate scanning direction. In a case where enlargement is performed by a factor of two in the subordinate scanning direction, it will suffice to divide the pixel of interest in half in the subordinate scanning direction and decide the subdivided-pixel density in accordance with the relationships shown in FIGS. 11 and 12. In the case of patterns other than these, the corresponding pixel of interest is adopted as the density value of the subdivided pixels. In a case where doubling is performed in the main scanning direction, it will suffice to use the results obtained by rotating FIGS. 11 and 12 by 90°. Furthermore, by making various combinations of doubling in the main scanning direction and doubling in the subordinate scanning direction, contour smoothing and enlargement by a factor of m in the main scanning direction and n in the subordinate scanning direction becomes possible.

<Description of multivalue-converting circuit (FIGS. 13–16)>

Figure 13:
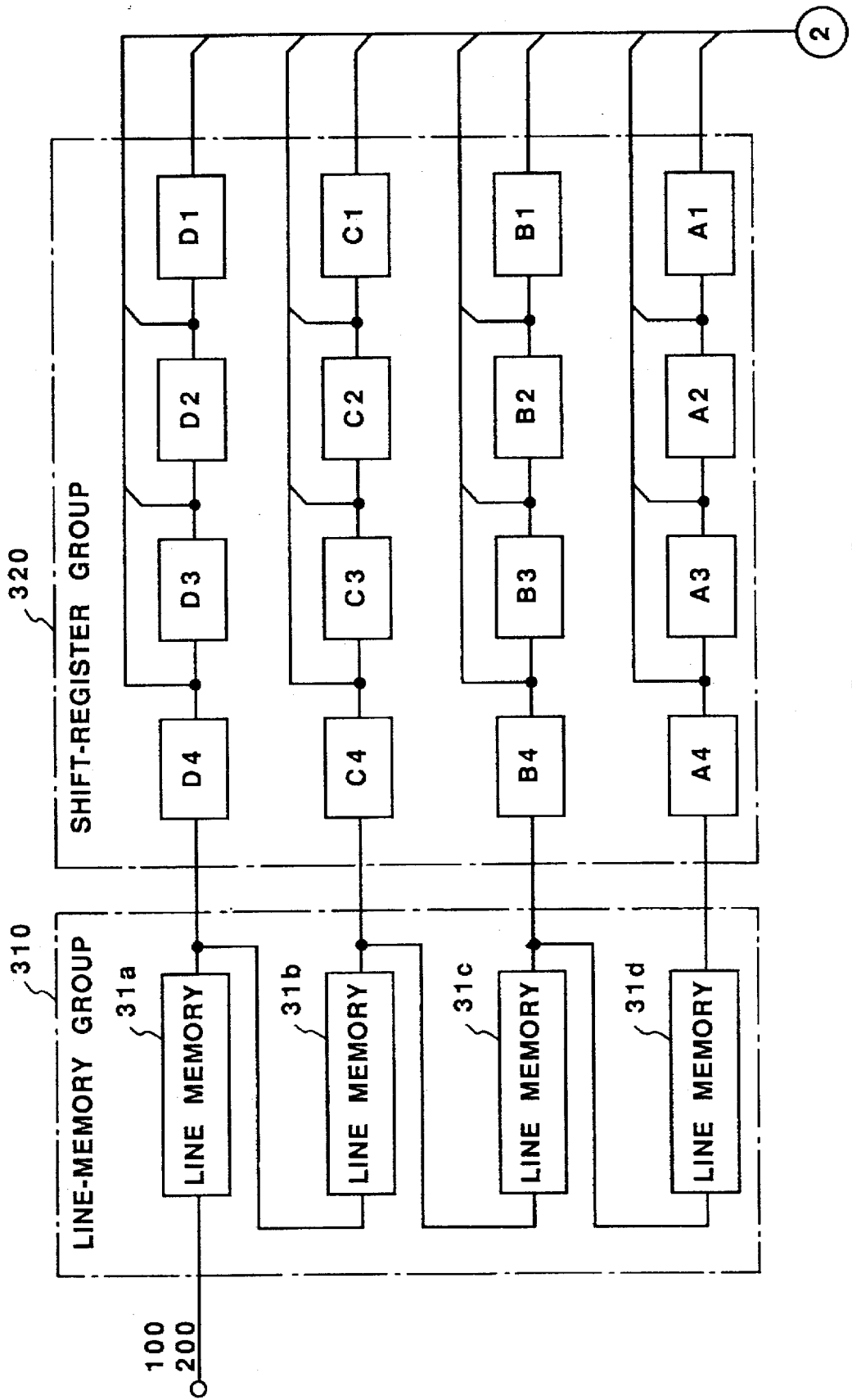

The specific construction of the multivalue-converting circuit 3 shown in FIG. 2 will now be described with reference to FIGS. 13 and 14.

The multivalue-converting circuit 3 according to this embodiment comprises line memories 31a–31d, a shift-register group 320, a weighting table 330, a data selecting multiplexer 340, a gate group 350, an adder 360, a data line 370 on which data is outputted from the weighting table 330, and a data line 380 for selecting a data group from the weighting table 330 in dependence upon the rate of change in magnification. On the basis of the inputted binary data, reference is made to an area comprising the pixel of interest (i,j) and its peripheral pixels, average density weighted by a weight mask (in this embodiment, matrix data outputted by the weighting table 330) corresponding to each pixel within the area is calculated, and this is outputted as multivalued density data (having a maximum value of 63 in the case of six bits).

The operation of the multivalue-converting circuit 3 will now be described in detail. First, in a case where enlargement processing is performed in either the main or subordinate scanning direction, the binary image data is inputted from the input line 200 in synchronization with the image clock CLK2 and line synchronizing signal DB2. In case of reduction processing, binary image data is inputted from input line 100 as is in synchronization with the image clock CLK2=CLK1 and line synchronizing signal DB2=DB1. The inputted binary image data first is read in line memory 31a of the line-memory group 310, and the data is sequentially shifted through the line memories in the manner 31b→31c→31d in the subordinate scanning direction line by line in synchronization with the line synchronizing signal DB2.

Four pixels of parallel data in the subordinate scanning direction are read out of the line memories 31a–31d in synchronization with the image clock CLK2, and this data is shifted into the shift-register group 320. In the shift-register group 320, the image data is successively shifted in synchronization with the image clock CKL2, image data having a matrix of four pixels by four lines is extracted, and this data is inputted to the gate group 350 as matrix data composed of 16 bits. If the data latched in shift register C3 is adopted as the pixel of interest (i,k), then, as shown in FIG. 15, each of the peripheral pixels will be data in which A1 is (i−2,j−2), A2 is (i−1,j−2), A3 is (i,j−2) and A4 is (i+1,j−2) and, in similar fashion, B1 is (i−2,j−1), B2 is (i−1,j−1), B3 is (i,j−1), B4 is (i+1,j−1), C1 is (i−2,j), C2 is (i−1,j), C4 is (i+1,j), D1 is (i−2,j+1), D2 is (i−1,j+1), D3 is (i,j+1) and D4 is (i+1,j+1).

Several types of matrix data of size 4×4 are stored in the weighting table 330 in advance. The sum of the matrix data outputted to the gate-group 350 is normalized in the weighting table 330 so as to attain the maximum value of the multivalued output (a maximum of 63 in the case of a six-bit output). FIG. 16 illustrates an example of weighting applied to individual pixels of the weighting table 330. For example, in case of a 90% reduction rate, a 3×3 window (the window size is made 3×3 by making "0" the weights of the pixels peripheral to the 3×3 window) having a large specific gravity with respect to the pixel of interest is used, as shown in (b) of FIG. 16. In case of a large reduction rate, a flat window of the kind shown in (c) of FIG. 16 is used. In case of a reduction rate of less than 50%, the window size is enlarged in dependence upon the reduction rate.

Address data for selecting a window conforming to the ratio of the change in magnification is inputted to the data multiplexer 340 via signal line 380, one of the matrix-data groups of the weighting table 330 is selected in dependence upon the address data, and the selected data is inputted to the gate group 350. Next, in a case where the image data extracted from the latches A1 through D4 is indicative of a black pixel, the gates in the gate group 350 which correspond to the individual latches open and the numerical data outputted by the data selecting multiplexer 340 is outputted to the adder 360. In case of image data indicative of a white pixel, the gates corresponding to the individual latches close and "0" is outputted to the adder 360.

The sum of the data outputted by the gate group 350 is calculated by the adder 360, and the sum is outputted on the signal line 300 as multivalued data of the pixel of interest. The signal line 380 in this embodiment inputs data in dependence upon the ratio of the change in magnification. However, a multivalued image having greater picture quality can be obtained by storing windows, which have appropriate weights for a character or line diagram or for a pseudo-half-tone image, in the weighting table 330 in advance, inputting data to which has been added the results of discrimination from an image discriminating circuit which discriminates whether the pixel of interest is a pseudo-half-tone area or a character/line-drawing area, and selecting separate matrix data with respect to individual image areas.

In this embodiment, the referential-pixel area for calculating the multivalued data is composed of 4 pixels×4 lines. However, this does not impose a limitation, for the referential-pixel area can be increased or decreased with ease by increasing or decreasing the line memories, shift registers, gates and weighting table.

<Description of the variable-power circuit (FIGS. 17 through 23)>

The details of the variable-power circuit 4 for subjecting multivalued image data to reduction processing will now be described.

First, processing for reducing an image by means of the variable-power circuit 4 is performed by thinning out of the image clocks and line synchronizing signals. Owing to simplicity of construction, this processing will described taking as an example the SPC (selected pixel coding) method, in which the converted image takes on the values of pixels closest to the original pixels.

Figure 17:
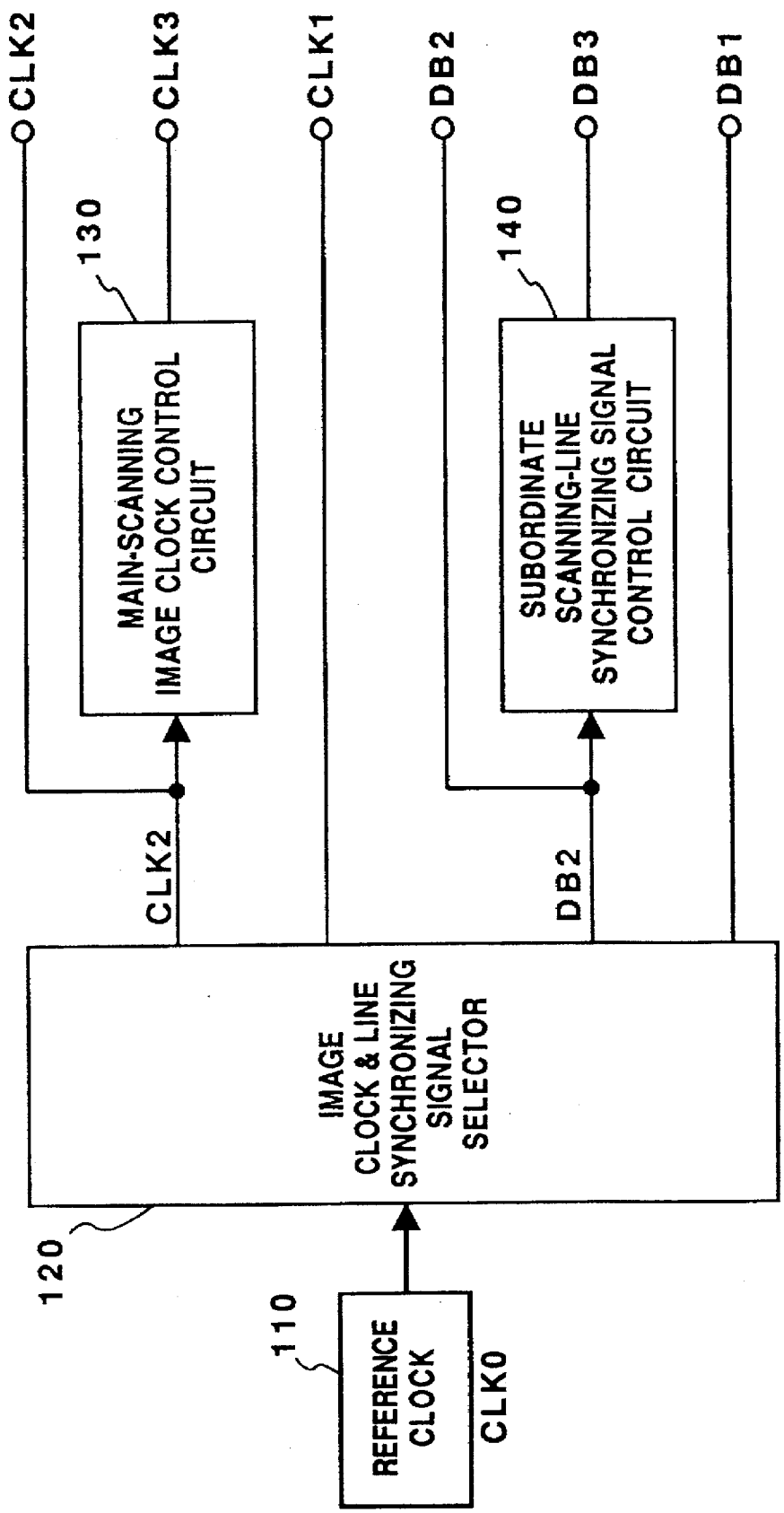
FIG. 17 is a block diagram showing the construction of a timing control circuit depicted in FIG. 2.

Before proceeding with the description, reference will be had to FIG. 17 to describe the details of the timing control circuit 1, which outputs an image clock signal CLK3 and a line synchronizing signal DB3 following reduction processing.

In FIG. 17, numeral 110 denotes a quartz oscillator for generating a reference clock, 120 a selector, which selects an image clock and a line synchronizing signal, for outputting the image clocks CLK1, CLK2 and line synchronizing signals DB1, DB2, numeral 130 a main-scanning image clock control circuit for performing any desired clock thinning in dependence upon the reduction ratio of the variable-power circuit in the main scanning direction, and 140 a subordinate scanning-line synchronizing signal control circuit for performing any desired clock thinning in dependence upon the reduction ratio of the variable-power circuit in the subordinate scanning direction.

In the foregoing arrangement, the selector 120, on the basis of an externally inputted reference clock CLK0, selects and outputs image clocks CLK1, CLK2, which are obtained by frequency-dividing the reference clock in dependence upon the ratio of magnification, in the main scanning direction, of the contour smoothing and enlargement circuit 2, and line synchronizing signals DB1, DB2 similarly decided by the ratio of magnification, in the subordinate scanning direction, in the contour smoothing and enlargement circuit 2. The outputted image clock CLK2 enters the main-scanning image clock control circuit 130, where the input image clock CLK2 is subjected to thinning processing in dependence upon the reduction ratio of the variable-power circuit 4, thereby outputting the image clock CLK3 of the reduced image data. Similarly, thinning processing of the line synchronizing signal DB2, which is reduction processing in the subordinate scanning direction in the variable-power circuit 4, is executed in the subordinate scanning-line synchronizing signal control circuit 140, whereby a line synchronizing signal DB3 of image data of the changed magnification is outputted.

The details of operation of the main-scanning image clock control circuit 130 will now be described with reference to FIG. 18.

Figure 18:
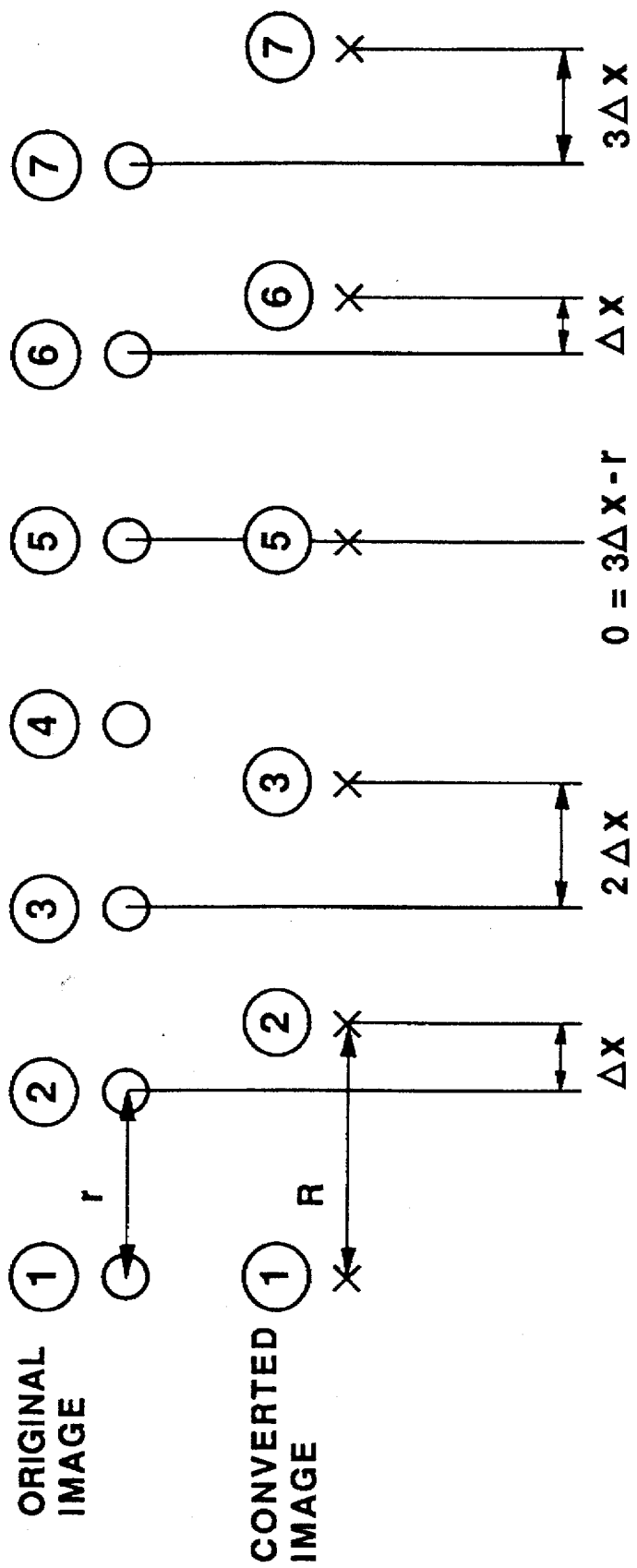
FIG. 18 is a diagram showing the positional relationship between an original image and a converted image in a magnification-changing circuit.

By way of example, in a case where the main scanning direction is reduced to $\gamma_x/R_x$ (where $\gamma_x$, $R_x$ represent arbitrary integers decided by the rate of reduction), the converted pixels will be disposed at intervals of distance $R_x$ if the original pixels are disposed as intervals of distance $\gamma_x$, as shown in FIG. 18. If we let $\Delta X=R_x-\gamma_x$ hold and the coordinates of the first original pixel and of the first converted pixel are made to coincide with the origin, $\Delta X$ is added to each original pixel such that the difference between the distances of the second original pixel and converted pixel is $\Delta x$ and the difference between the distances of the third original pixel and converted pixel is $2\Delta X$. Whenever the result of addition becomes greater than the distance $\gamma_x$ between the original images, the distance $\gamma_x$ is subtracted from the result of addition, at which time the coordinates of the original image are advanced by one. When the differences between the distances of the original image and converted image are thus calculated and the coordinates of the original image are thus advanced in dependence upon the results of calculation, the original image is advanced at a certain fixed rate in dependence upon the rate of reduction. Thinning processing in conformity with the ratio of reduction is carried out by making the remaining pixels the converted pixels. When similar processing is performed taking $2/\gamma x$ as the difference between the distances of the original image and converted image at the origin, thinning out of the original image is performed in such a manner that pixels of the converted image that are closest to the original image are selected. This is the equivalent of the SPC (selected pixel coding) method.

Figure 19:
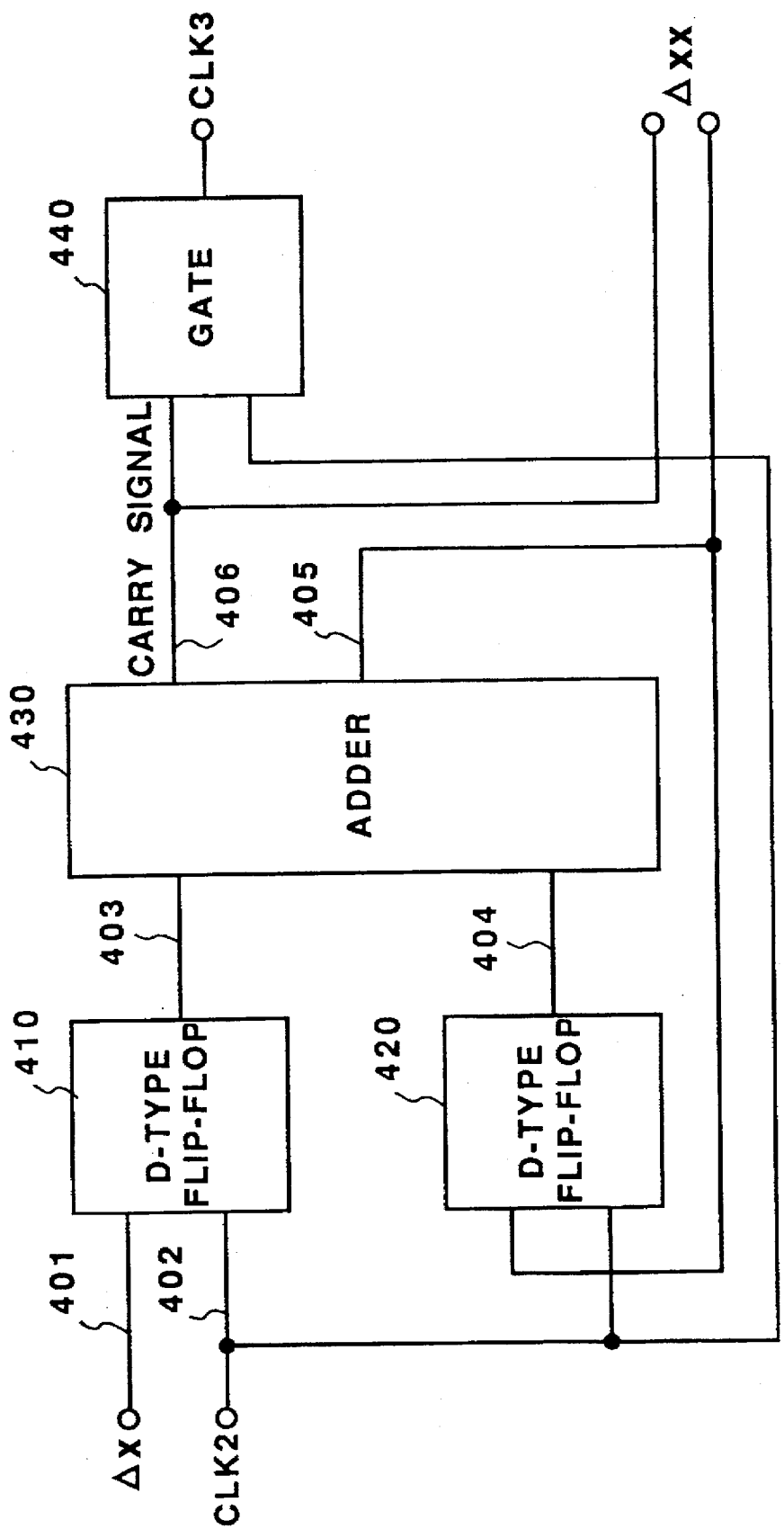
FIG. 19 is a diagram for describing clock thinning at the time of reduction at any magnification rate.
Figure 20:
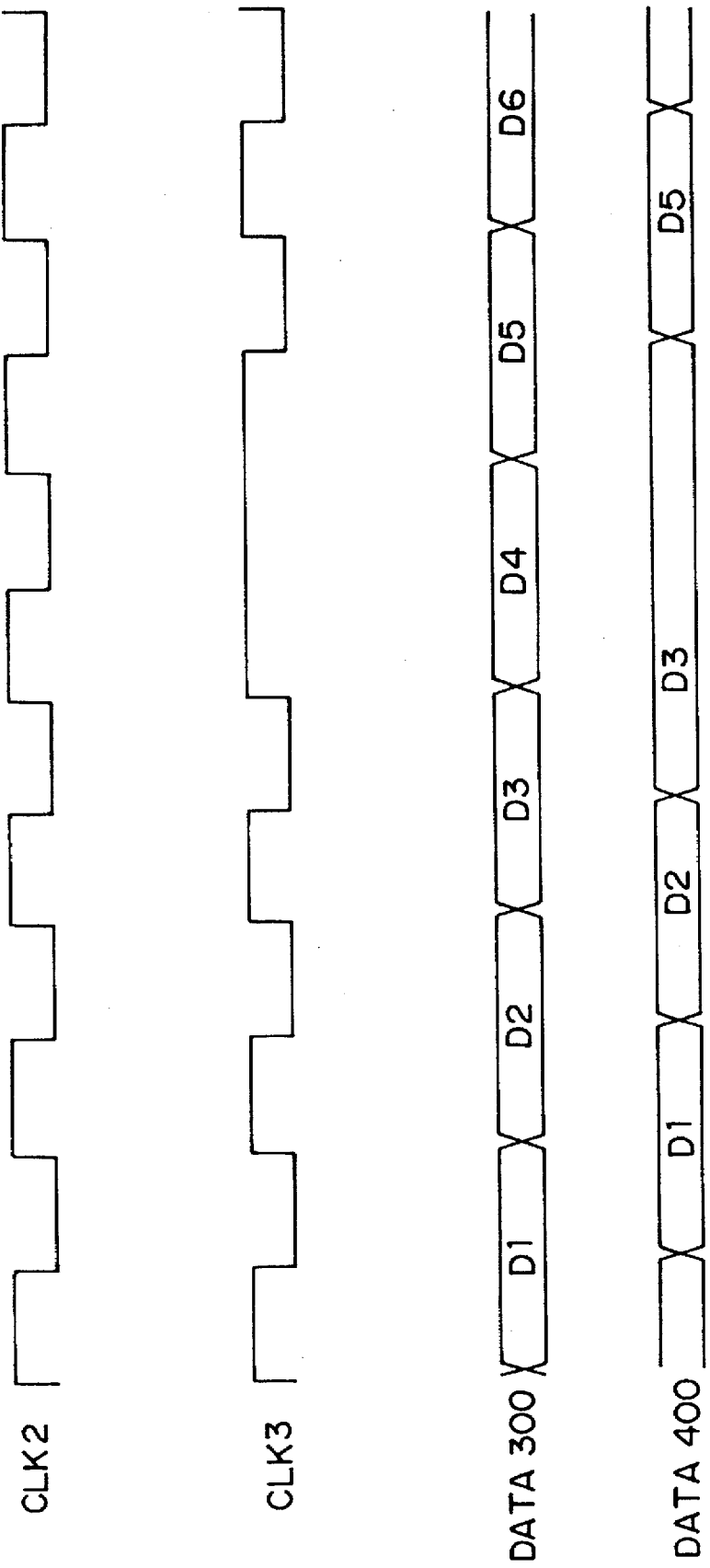
FIG. 20 is a timing chart for describing reduction in the main scanning direction.

Reference will be had to FIGS. 19 and 20 to describe in detail the operation of the main-scanning image clock control circuit 130 for a case where the pixel size of the original image in the main scanning direction is $\gamma_x=256$. In FIG. 19, numerals 410, 420 denote D-type flip-flops, 430 an eight-bit output adder having a carry-signal line, and 440 a gate circuit which gates the clock CLK2. As shown in FIG. 19, $\Delta X$ is inputted to the adder 430 in synchronization with CLK2. Here $\Delta X$ is a value decided in dependence upon the ratio of the change in a magnification. For example, in case of reduction to 8/11, we have $\Delta X=256\times 11/8-256=96$. The output of the adder 430 at the time of reset is $\gamma_x/2=128$. The result of the addition processing outputted on signal line 405 enters the D-type flip-flop 420 and is inputted to the adder 430 in synchronization with CLK2. The values outputted by the D-type flip-flops 420 and 430 are added by the adder 430 in synchronization with the image clock CLK2, so that $\Delta X$ is successively added to the immediately preceding results of addition. Only eight bits of data from the output of the adder 430 are returned to the D-type flip-flop 420 via the signal line 405.

Accordingly, whenever the result of addition exceeds $\gamma x$ (256), subtraction of $\gamma x$ is carried out. The image clock CLK2 inputted to the gate 440 is subjected to masking processing by the carry signal of adder 430 outputted on the output line 406, and the image clock CLK3 obtained by thinning out the clock CLK2 is outputted. As illustrated in FIG. 20, the image data inputted in synchronization with the image clock CLK2 is sampled by CLK3, whereby thinning-out processing in the main scanning direction is performed. The subordinate scanning-line synchronizing signal control circuit 140 is constructed in the same manner as the main-scanning image clock control circuit 130, thinning-out processing is applied to the line synchronizing signal DB2, and DB3 is outputted. Reduction in the subordinate scanning direction is performed by thinning out the line synchronizing signal in the same manner as in the main scanning direction.

In this embodiment, a case is described in which the original image is thinned out and reduced by thinning out the image clock and line synchronizing signal using the variable-power circuit 4. However, it is also possible to obtain a converted image by processing using the original image data and perform processing for changing magnification. The processing for changing magnification in this case will now be described.

As set forth above, the difference between the distances of the original image and converted image can be obtained as an output from the main-scanning image clock control circuit 130 and subordinate scanning-line synchronizing signal control circuit 140. Accordingly, the weighting of image data in the vicinity of the converted pixels is carried out from the positional relationship between the original image and the image whose magnification has been changed, and the converted-image density is calculated, whereby it is possible to obtain multivalued density data, whose magnification has been changed, from the SPC method, which data excels in terms of density preservation. As for the weighting method, use can be made of the distance inverse-proportion method. It is also possible to use the rate of area occupancy, namely the area which the converted pixel occupies in the original pixels. The portion enclosed by the broken line in FIG. 23 represents the original pixels, and the portion enclosed by the solid line represents the converted pixels.

Figure 21:
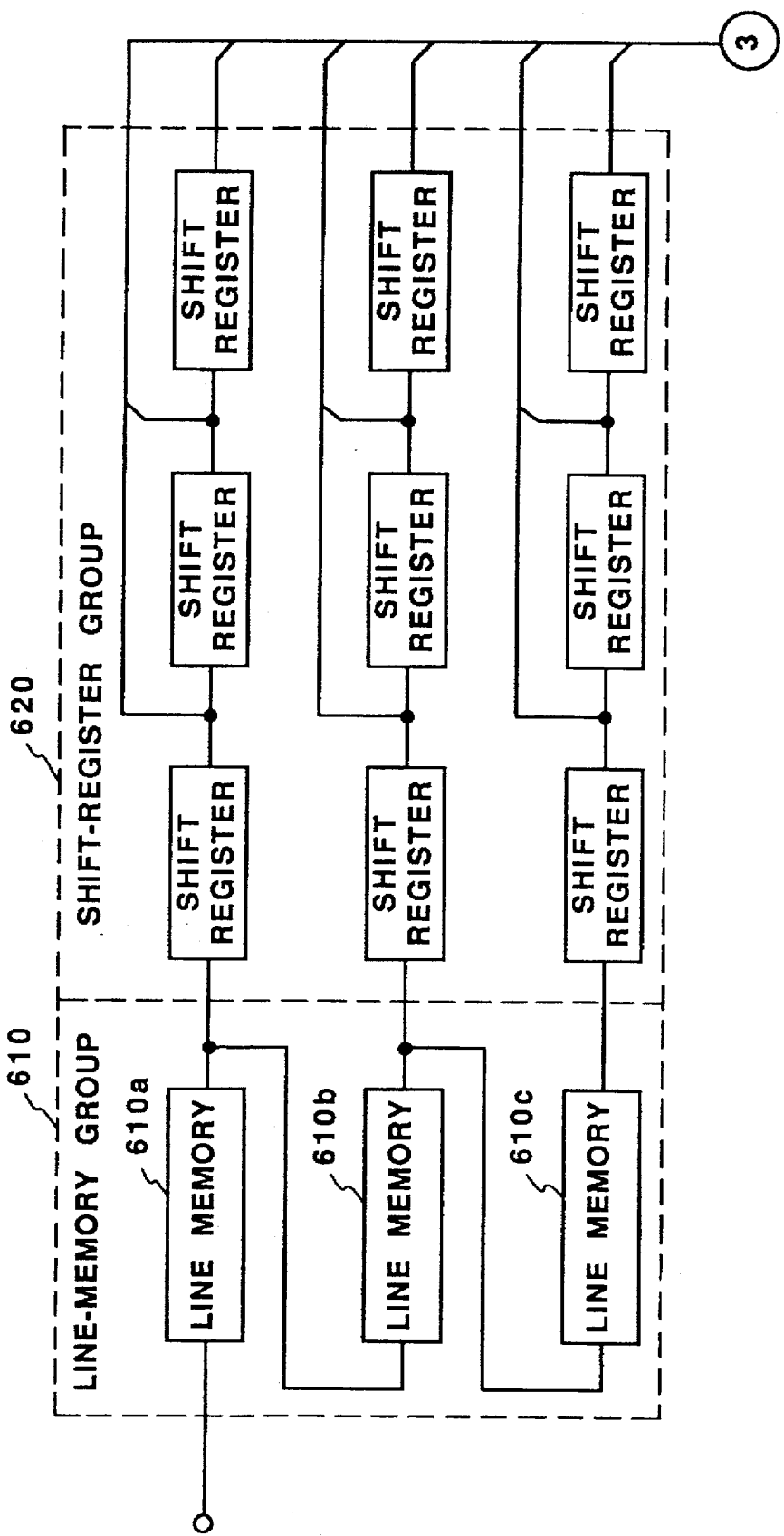
FIGS. 21 and 22 are block diagrams for describing the construction of a circuit which obtains reduced pixel density by an arithmetic operation.
Figure 22:
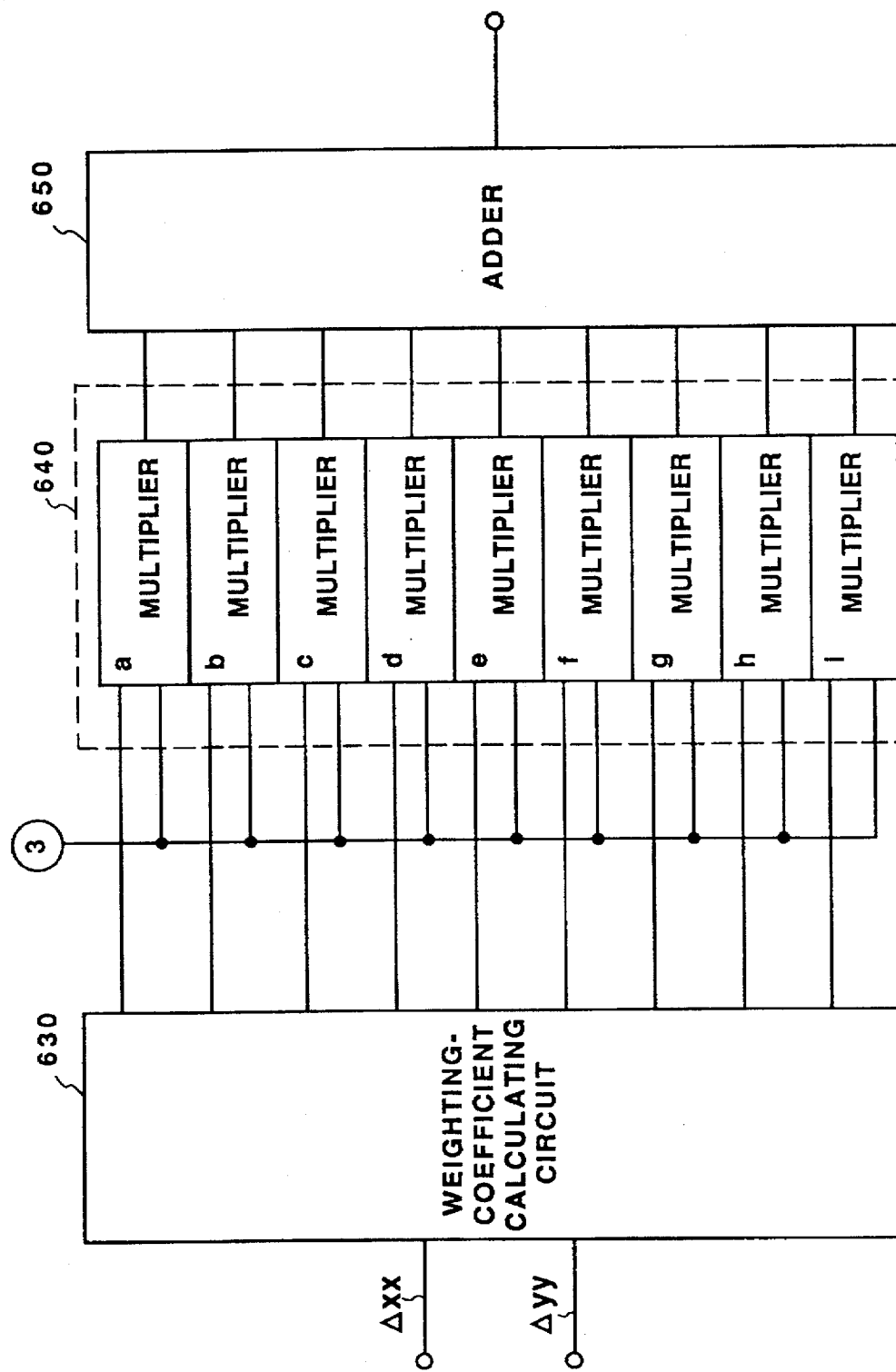

FIGS. 21 and 22 are block diagrams illustrating the construction of a density calculating circuit for the case where the rate of area occupancy is used. Shows in these drawings are a line-memory group 610 composed of line memories 610a, 610b, 610c, a shift-register group 620, a weighting-coefficient calculating circuit 630 for calculating the weights of individual pixels from the positional relationship between converted pixels and original pixels, a multiplier group 640 composed of a plurality of multipliers 640a, 640b, 640c, 640d, 640e, 640f, 640g, 640h, 640i, and an adder 650. In this arrangement, data indicative of the original pixels (peripheral pixels) in the vicinity of the converted pixel (the pixel of interest) can be obtained by the line-memory group 610 and shift-register group 620 in the same manner as the case illustrated by the multivalue-converting circuit 3. In this embodiment, an example is illustrated in which, when reduction in excess of 50% is performed, the fact that the converted pixel receives the influence of a maximum of nine pixels with regard to the original pixels is taken into consideration, and matrix data of 3 pixels×3 lines is extracted by the aforementioned circuit. It is possible for the referential pixels to be taken arbitrarily, in the same manner as the case illustrated by the multivalue-converting circuit 3.

A method of calculating weighting coefficients outputted by the weighting-coefficient calculating circuit 630 will now be described.

Figure 23:
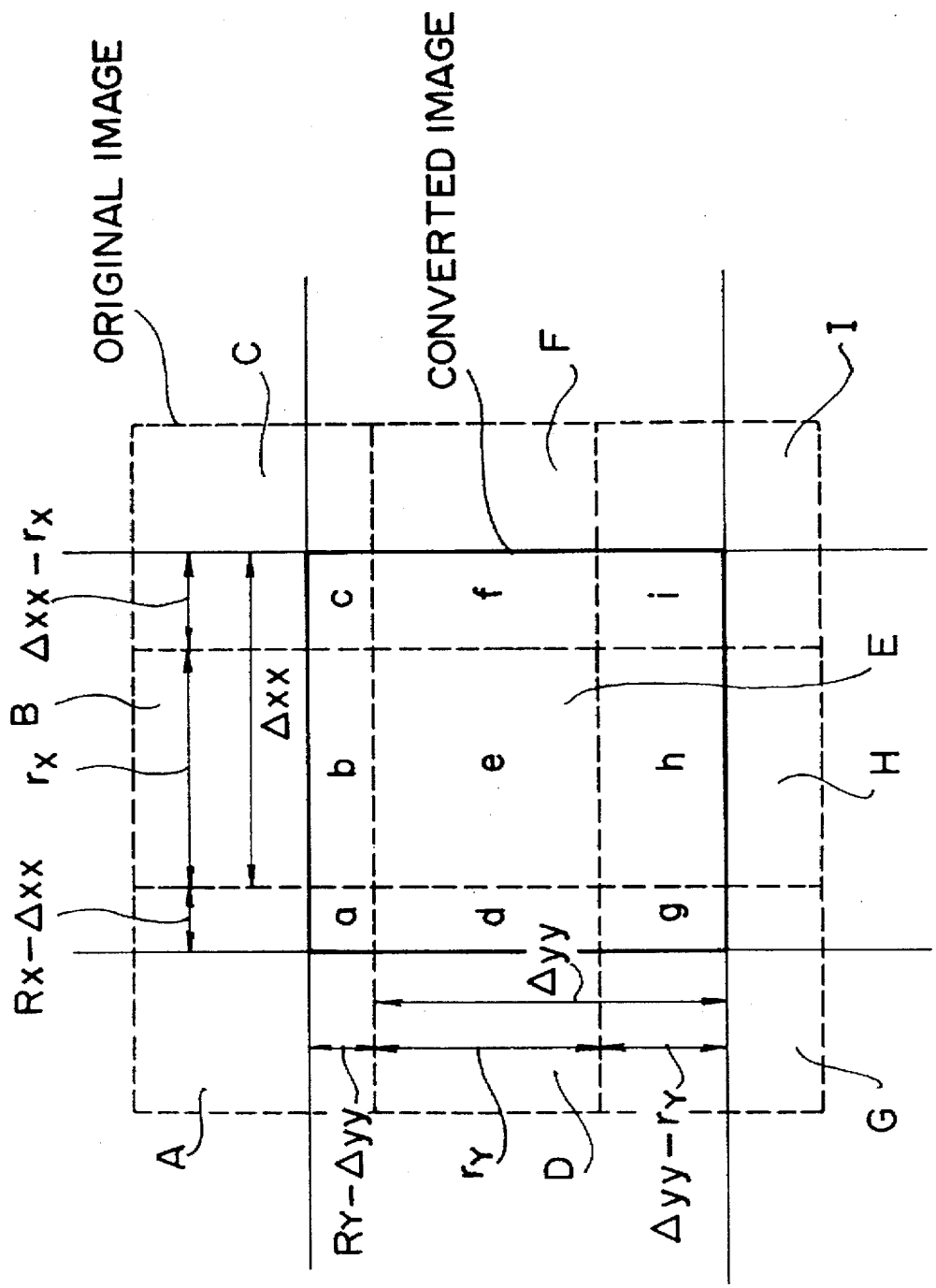
FIG. 23 is a diagram for describing weighting when reduction zooming is performed.

As illustrated in FIG. 23, the lengths ($R_X$–$\Delta xx$, $\gamma X$, $\Delta xx$–$\gamma_x$, $R_Y$–$\Delta yy$, $yy$, $\Delta yy$–$\gamma y$) of individual sides of the converted pixel divided by the original pixels are obtained using the results of addition and the carry signals ($\Delta xx$, $\Delta yy$) outputted by the main-scanning image clock control circuit 130 and subordinate scanning-line synchronizing signal control circuit 140. Here $\Delta xx$, $\Delta yy$ are the differences between the distances of the original pixels and the converted pixel inclusive of the carry signal. In a case where the converted pixel does not span three pixels of the original pixels, the lengths of the individual sides are represented by $R_X$–$\Delta xx$, $\Delta xx$, $R_Y$–$\Delta yy$, $\Delta yy$. Next, the area which the converted pixel occupies in the original pixels is calculated from the lengths of the sides. For example, the area a which the converted pixel occupies in an original pixel A is ($R_X$–$\Delta xx$)×($R_Y$–$\Delta yy$), and the area b which the converted pixel occupies in an original pixel B is $\gamma_x$×($R_Y$–$\Delta yy$). Areas c, d, e, f, g, h and i are subsequently calculated in the same manner. The individual areas a, b, c, d, e, f, g, h and i are normalized by the area of the converted pixel, and the results are used as the weighting coefficients of the corresponding pixels. The weighting is uniquely defined by the differences $\Delta xx$, $\Delta yy$ between the distances of the original image and converted image outputted by the main-scanning image clock control circuit 130 and subordinate scanning-line synchronizing signal control circuit 140. Therefore, it will suffice to store the weighting data in a ROM table using $\Delta xx$, $\Delta yy$ as the addresses of the table, and use this ROM in place of the weighting-coefficient calculating circuit 630. An arrangement using a ROM in this manner is possible also in the case of the distance inverse-proportion method.

Next, weighting of original pixel density is carried out with regard to the weighting data obtained by the weighting-coefficient calculating circuit 630. In this processing, a product i with regard to the original pixel density value is obtained by multipliers 640a through 640i, the sum of the outputs from the individual multipliers is obtained by the adder 650, and the sum is eventually outputted as the density value of the pixel of interest.

<Description of binarizing circuit (FIGS. 24–26)>

Figure 24:
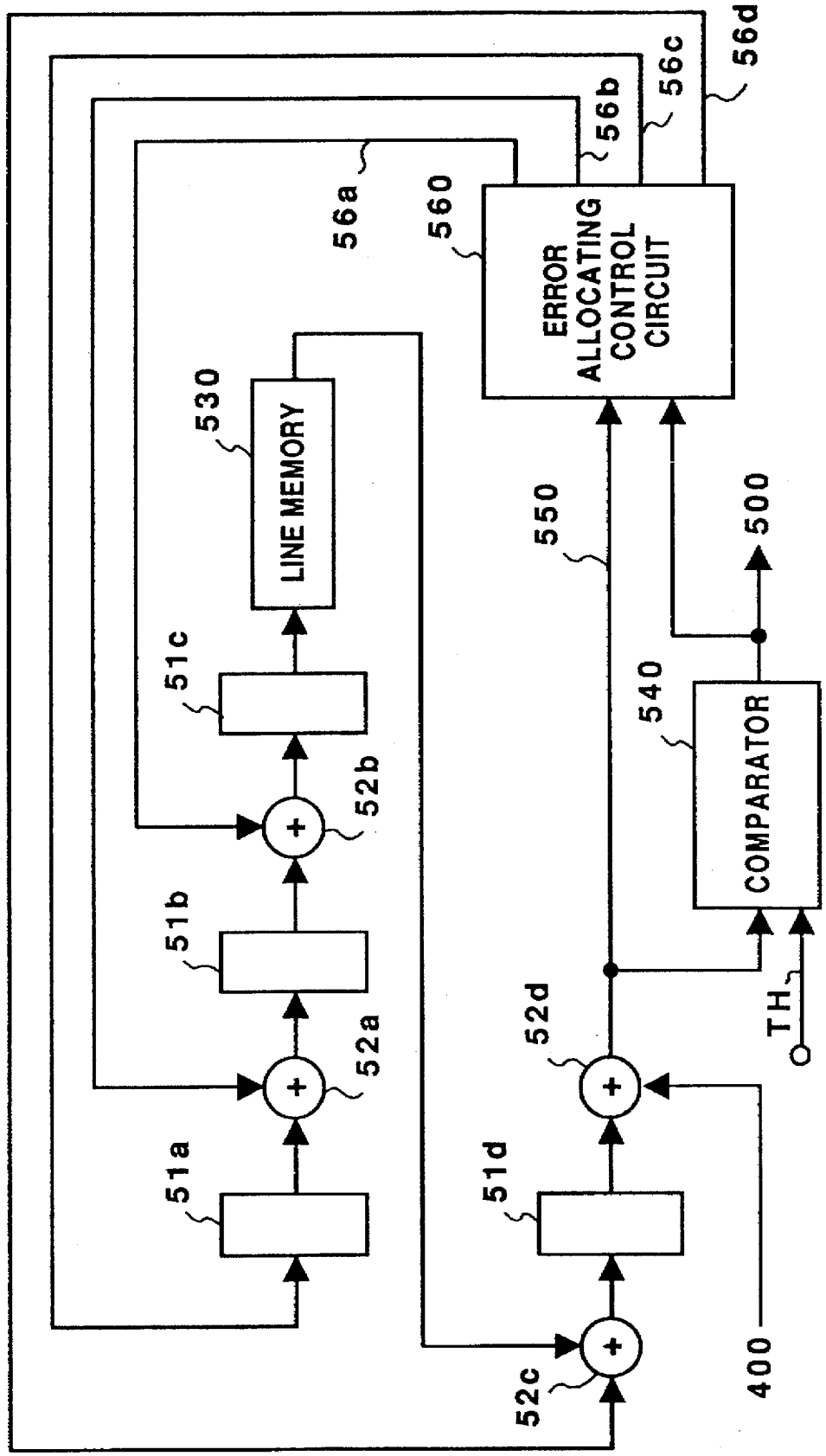
FIG. 24 is a block diagram showing the construction of a binarizing circuit depicted in FIG. 2.

FIG. 24 is a diagram showing a specific example of the construction of the binarizing circuit 5 illustrated in FIG. 2. The binarizing circuit 5 converts the image data, which has been converted into multivalued data in the multivalue-converting circuit 4, back into binary data and outputs binary data the magnification of which has been changed. All binarizing methods, such as the dither method or the mean error minimizing method, can be utilized as the binarizing method. Here use is made of the error diffusion method, through which it is possible to obtain a zoomed image having excellent density preservation, by performing binarization upon diffusing, to the peripheral pixels, the error produced when binarization is carried out.

The details of the binarizing circuit 5 using error diffusion processing will now be described with reference to the drawings.

Shown in FIG. 24 are D-type flip-flops 51a–51d which latch data, adders 52a–52d, a line memory 530 for a one-line delay, a comparator 540, and an error allocating control circuit 560.

In the above-described arrangement, image data of multivalued (e.g., "0"–"63" in the case of six bits) density outputted by the variable-power circuit 4 is inputted via signal line 400 in synchronization with the image clock CLK3 and line synchronizing signal DB3. Here the inputted multivalued density data [the multivalued density data of the original image corresponding to the position (i,j) of the pixel of interest] is added, by adder 52d, to the sum of the errors allocated to this pixel position, and the resulting signal is outputted to the comparator 540 and error allocating control circuit 560. The comparator 540 compares the data on the signal line with a fixed threshold value TH (e.g., "32" in case of six-bit data). If the value of the data on the signal line is greater than the threshold value TH, "1" (black) is outputted on signal line 500 in synchronization with the image clock CLK3 and line synchronizing signal DB3. If the value of the data on the data line is less than TH, "0" (white) is outputted on the signal line 500 in synchronization with these signals.

Figure 25:
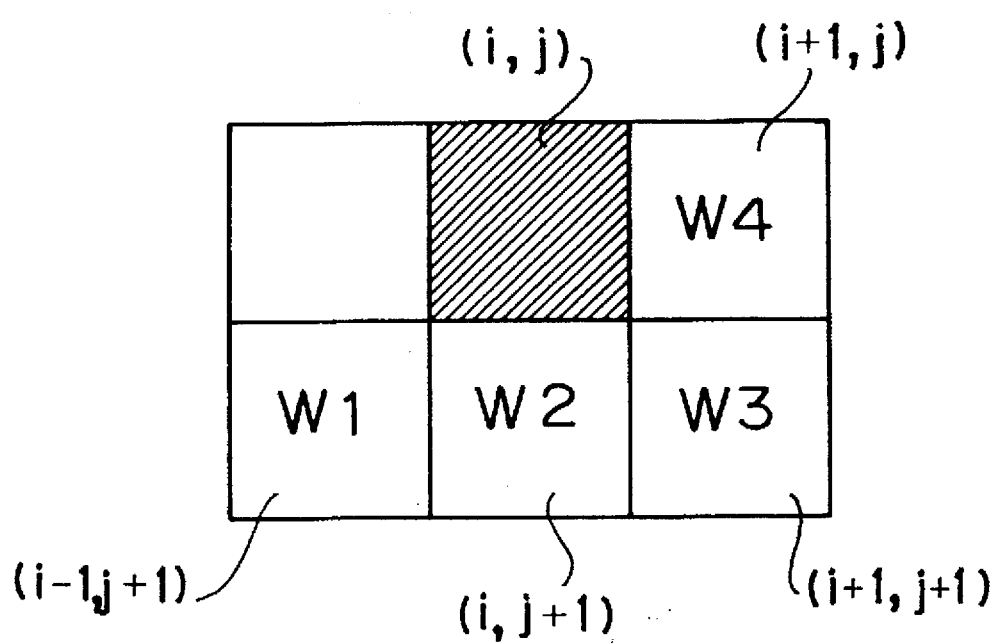
FIG. 25 is a diagram showing the relationship between a pixel of interest and pixels which distribute error.

Next, in dependence upon the results of binarization, the error allocation control circuit 560 calculates error quantities 56a–56d, which are allocated to the peripheral pixels, with the data inputted from signal line 550 serving as the error if the the output is white, and the difference between signal line 550 and a constant T ("63" in case of six-bit data) serving as the error if the output is black. When position of the pixel of interest is (i,j), as shown in FIG. 25, the error-quantity signals 56a–56d are added, by the respective adders 52a–52d, to the error quantities already allocated to the peripheral pixels (i–1, j+1), (i, j+1), (i+1, j+1), (i+1, j). Though the number of pixels to which the error is allocated are the four pixels of the pixel of interest, this does not impose a limitation; the number readily be increased or decreased.

The details of construction of the error allocating circuit 560 will now be described with reference to FIG. 26.

Figure 26:
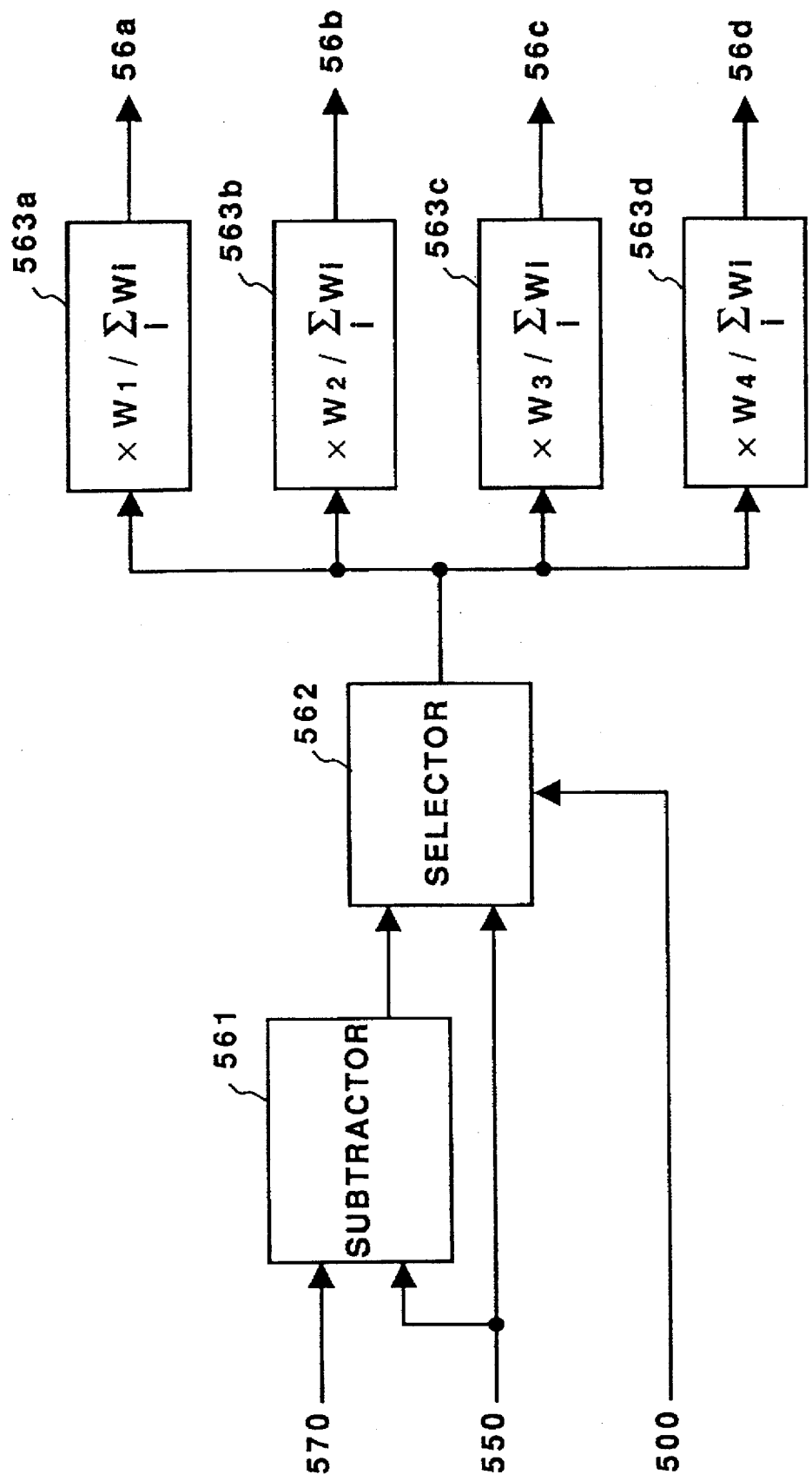
FIG. 26 is a block diagram showing the construction of an error-distribution control circuit depicted in FIG. 24.

Shown in FIG. 26 are a subtractor 561, a selector 562 and multipliers 563a–563d for performing prescribed multiplication operations. First, the subtractor 561 calculates the difference (signal 550—constant T) between the signal 550 of correction density, obtained by adding the allocated error to the original image density, and the signal (constant T=63) from signal 570, and outputs this difference to the selector 562. In dependence upon the binarized result inputted from the signal line 500, the former (signal 550) is selected if the binarized result is "0" (white), and the latter (signal 550—T) is selected if the binarized result is "1" (black). The selected item is outputted to the multipliers 563a–563d. As shown in FIG. 25, the multipliers 563a–563d correspond to the peripheral pixels (i−1, j+1), (i, j+1), (i+1, j+1), (i+1, j) having the respective weights $w_1$–$w_4$ with respect to the pixel of interest (i,j). The following multiplication operations are performed in dependence upon the weight, and the results are outputted on signal lines 56a, 56b, 56c and 56d:

$$(\text{signal line } 56a) = (\text{input from selector 562}) \times w_1 / \sum_{i=1}^{4} w_i$$

$$(\text{signal line } 56b) = (\text{input from selector 562}) \times w_2 / \sum_{i=1}^{4} w_i$$

$$(\text{signal line } 56c) = (\text{input from selector 562}) \times w_3 / \sum_{i=1}^{4} w_i$$

$$(\text{signal line } 56d) = (\text{input from selector 562}) \times w_4 / \sum_{i=1}^{4} w_i$$

By virtue of the binarizing method described above, it is possible to obtain a binary image, which excels in preservation of density, with regard to pseudo-half-tones.

In accordance with this embodiment, as described above, regardless of whether the inputted binary digital image is a pseudo-half-tone or character image, processing for conversion from a binary value to multiple values is performed, the individual pixels are converted into multivalued densities, and then zoom processing for changing magnification is carried out, whereby a high-quality image of any zoom magnification can be obtained. At the time of enlargement processing, a character or line drawing is subjected to contour smoothing and enlargement decided by the pixel of interest and its peripheral pixels. As a result, it is possible to smoothen the differences in level of diagonal-line portions, which tend to become conspicuous when a character or line drawing is enlarged.

A second embodiment according to the invention will now be described with reference to the drawings.

In the first embodiment set forth above, contour smoothing and enlargement is carried out as enlargement processing. In the second embodiment, enlargement processing is executed by enlarging a binary value by a factor of an integral number.

<Description of zoom processing (FIG. 27)>

The flow of processing for changing magnification according to this embodiment will be described in detail with reference to FIG. 27.

Figure 27:
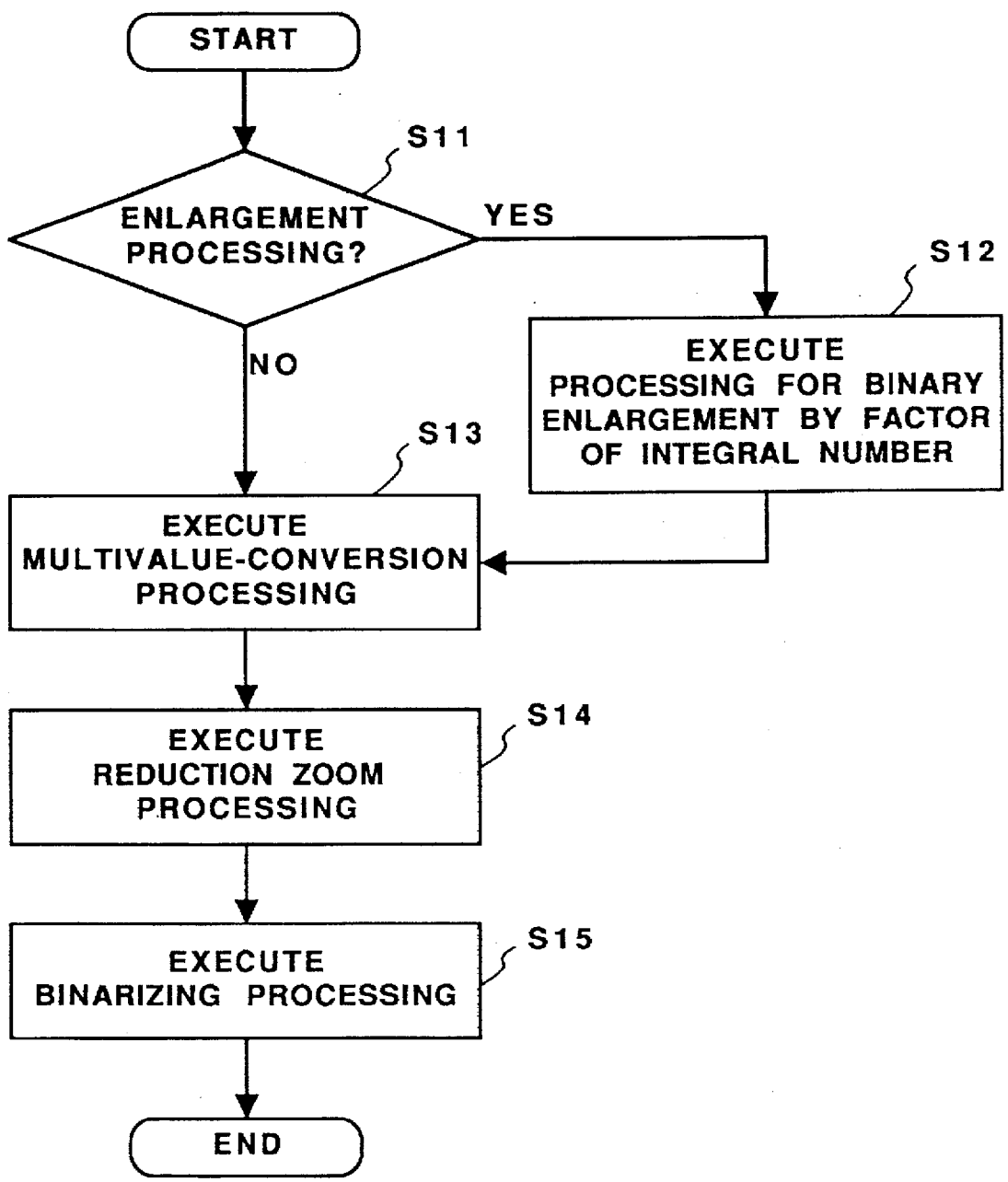
FIG. 27 is a flowchart showing zoom processing in a second embodiment.

FIG. 27 is a flowchart illustrating the processing for applying a change in magnification so that binary data of x pixels in the main scanning direction and y pixels in the subordinate scanning direction is changed to binary data of X pixels in the main scanning direction and Y pixels in the subordinate scanning direction. At step S11 of the flowchart, it is determined whether enlargement processing is to be applied regardless of the main or subordinate scanning direction. If enlargement processing is not applied, i.e., if reduction processing is to be applied, the program proceeds to step S13. In case of enlargement processing, the program proceeds to step S12.

(1) Enlargement processing

If enlargement processing is to be applied, processing for binary enlargement by a factor of an integral number is executed at step S12. According to this processing, the binary digital data of x pixels in the main scanning direction and y pixels in the subordinate scanning direction is converted, by overlay processing, into binary data of (nx× my) pixels by zooming by a factor of n in the main scanning direction (n=[X/x], where [a] represents an integer not smaller than a) and m in the subordinate scanning direction (m=[Y/y], where Y>y). Next, at step S13, the binary data obtained at step S12 is scanned pixel by pixel using a window conforming to the ratio of the change in magnification, namely the zoom ratio, multivalued-density data is calculated from the pixel pattern of the binary image within the window, and this data is converted into image data of multivalued density of (nx×my) pixels. This is followed by step S14, at which the image data of multivalued density of the (nx×ny) pixel size obtained by the conversion at Step S13 is subjected to thinning-out processing by a clock and line synchronizing signal, the data is zoomed down to any size and is converted into image data of multivalued density of (X×Y) pixels. Next, at step S15, the image data of multivalued density of (X×Y) pixels is subjected to binarizing processing, whereby (X×Y)-pixel binary image data of changed magnification is obtained.

(2) Reduction processing

In case of reduction processing, step S13 is executed, where the (x×y) pixel binary data is scanned pixel by pixel using a window conforming to the ratio of the change in magnification, multivalued-density data is calculated from the pixel pattern of the binary image within the window, and this data is converted into image data of multivalued density of (x×y) pixels. This is followed by step S14, at which the image data of multivalued density of the (x×y) pixel size obtained by the conversion at step S13 is subjected to thinning-out processing by a clock and line synchronizing signal, the data is zoomed down to any size and is converted into image data of multivalued density of (X×Y) pixels. Next, at step S15, the image data of multivalued density of (X×Y) pixels is subjected to binarizing processing, whereby (X×Y)-pixel binary image data of changed magnification is obtained.

In the flow described above, window scanning is performed in which the referential pixels differ depending upon the ratio of magnification when the binary image is converted into the multivalued-density image data. At the time of enlargement processing, the binary image is converted into the multivalued-density image data once the enlargement processing has been applied to the data in binary form. As a result, it is possible to obtain a zoomed image in which blurring of edge portions of the image, which occurs at the time of the conversion to the multivalued data, is suppressed to the maximum degree.

<Description of circuit arrangement (FIG. 28)>

FIG. 28 is a block diagram showing the construction of an apparatus for converting pixel density according to this embodiment. The circuit elements will now be described in sequence.

In FIG. 28, numeral 100 denotes the data line for inputting data to the apparatus. Specifically, black-and-white binary digital data expressed by one bit per pixel (in which "1" represents black and "0" represents white) enters the apparatus on data line 100. In the case where enlargement processing is executed, the binary data inputted from line 100 is enlarged by a factor of n (an integer) in the main scanning direction and m (an integer) in the subordinate scanning direction by overlay processing in a binary enlarging circuit 7. The resulting data is outputted from the selector 6 to the multivalue-converting circuit 3 via a signal line 700. In the case where a reduction in magnification is carried out, the binary data inputted from the signal line 100 is inputted as is from the selector 6 to the multivalue-converting circuit 3. The selector 6 selects the binary data inputted from signal line 700 at the time of enlargement processing and the binary data inputted from signal line 100 at the time of reduction processing. The selected data is fed into the multivalue-converting circuit 3.

In the multivalue-converting circuit 3, the data is temporarily stored in a memory (not shown), and image data in any desired region is extracted. While reference is made to the region, which comprises a pixel of interest and its peripheral pixels, multivalued-density image data (e.g., "0"~"63" in the case of a six-bit output, wherein "0" and "63" represent white and black, respectively) is calculated based upon a window outputted from a weighting table, and the multivalued data is outputted to the variable-power circuit 4 via the signal line 300. Next, the variable-power circuit 4 changes magnification to reduce the multivalued-density image data, which has been outputted by the multivalue-converting circuit 3, to any desired size by the thinning-out processing of an image clock and line synchronizing signal. The resulting image data is outputted to the binarizing circuit 5 via a signal line 400. The binarizing circuit 5 converts the multivalued data outputted by the variable-power circuit 4 into binary data and outputs the binary data on a data line 500.

The details of construction of the pixel-density converting apparatus having the foregoing configuration will be set forth with reference to the related diagrams. The timing control circuit 1, multivalue-converting circuit 3, variable-power circuit 4, binarizing circuit 5 and selector 6 are the same as in the first embodiment and need not be described again.

<Description of binary enlarging circuit (FIGS. 29–31)>

Figure 29:
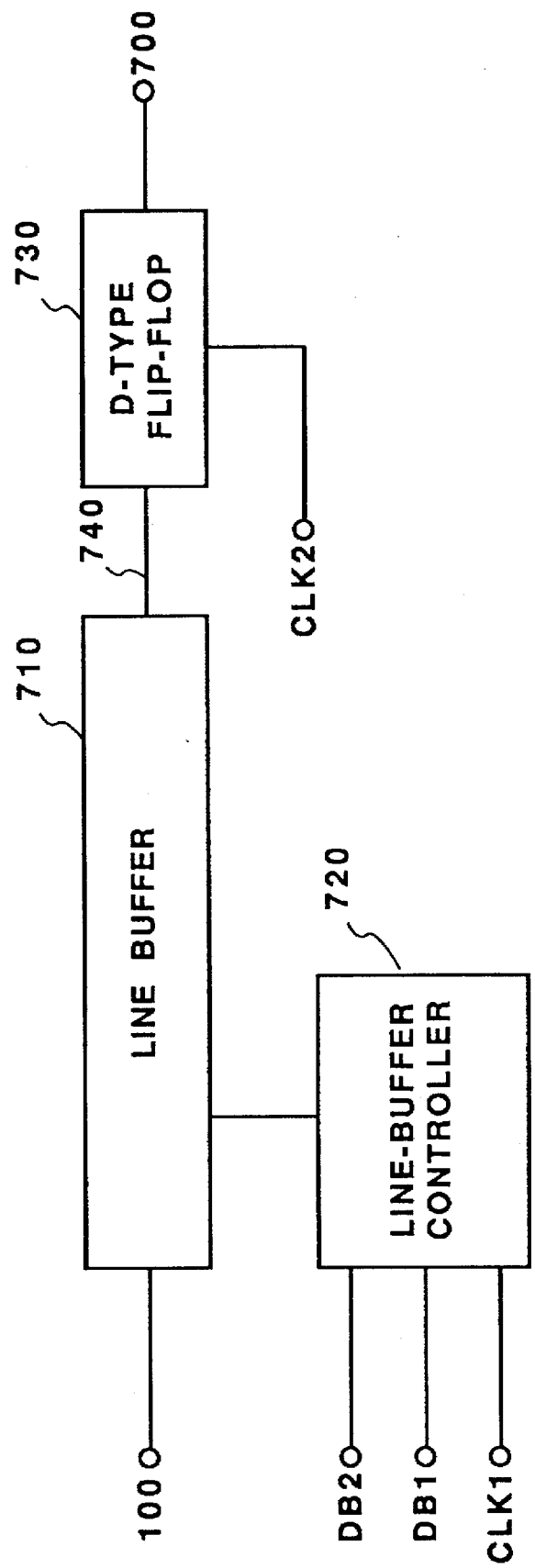
FIG. 29 is a block diagram showing the construction of a binary enlarging circuit depicted in FIG. 28.

FIG. 29 is a block diagram illustrating the construction of the binary enlarging circuit 7 shown in FIG. 28. As illustrated in FIG. 29, the binary enlarging circuit 7 comprises a line buffer 710, a line-buffer controller 720 and a D-type flip-flop 730. Simple repeated processing is performed by control of the image clocks CLK1, CLK2 and line synchronizing signals DB1, DB2, whereby the binary image is enlarged. First, binary image data, in which one pixels is represented by one bit, is inputted to the line buffer 710 in synchronization with the image clock CLK1 and line synchronizing signal DB1 outputted by the timing control circuit 1. In the case where the image clock CLK1 and line synchronizing signal DB1 are enlarged by a factor of n in the main scanning direction and m in the subordinate scanning direction, the result of frequency-dividing the image clock CLK2, following overlay processing, by n and the result of frequency-dividing the line synchronizing signal DB2 by m are selected by the timing control circuit and inputted to the binary enlarging circuit.

Figure 30:
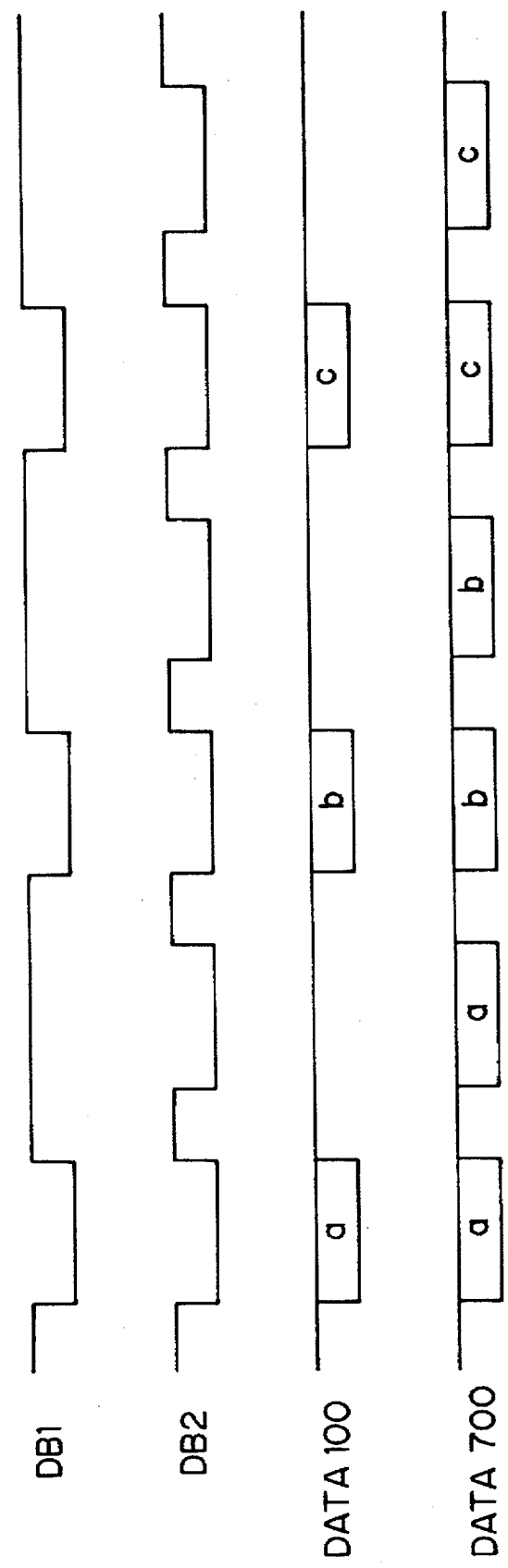
FIGS. 30 and 31 are timing charts for describing the operation of the binary enlarging circuit.

Next, the binary image data inputted from signal line 100 is written in the line buffer 710 by the line-buffer controller 720 in synchronization with the image clock CLK1 and line synchronizing signal DB1. At the same time, binary image data is read out and outputted on signal line 740 in synchronization with CLK1 and DB2. By virtue of the relationship between DB2 and DB1, data is read out m times whenever one line of image data is written in, and enlargement processing by a factor of m is performed in the subordinate scanning direction. As an example, a case in which processing for enlargement by a factor of two in the subordinate scanning direction is illustrated in FIG. 30. As shown, image data inputted in synchronization with DB1 is read out of the memory in synchronization with DB2 and data on the same line is outputted twice.

Figure 31:
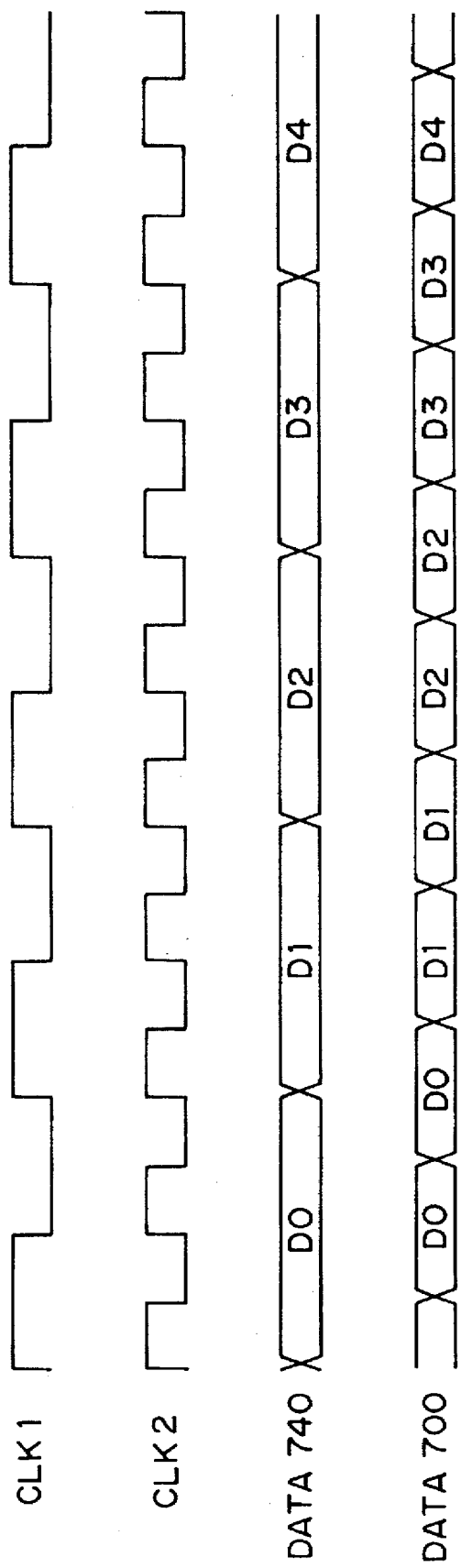

The image data outputted from the line buffer 710 in synchronization with the image clock CLK1 enters the D-type flip-flop 730 via the signal line 740 and is sub-sampled by the image clock CLK2. That is, one bit of binary data inputted in synchronization with CLK1 is sampled n times by CLK2, whereby enlargement is performed by a factor of n in the main scanning direction. FIG. 31 is a timing chart showing a case in which enlargement is performed by a factor of two in the main scanning direction.

In accordance with this embodiment, as described above, regardless of whether the inputted binary digital image is a pseudo-half-tone or character image, processing for conversion from a binary value to multiple values is performed, the individual pixels are converted into multivalued densities, and then processing for changing magnification is carried out, whereby a high-quality pseudo-half-tone image can be obtained. In addition, when the binary data is converted into multivalued data, the binary data is enlarged as is at the time of enlargement processing, thereby suppressing the blurring of character and line-drawing edges. Similarly, a high-quality binary image of changed magnification can be obtained by changing the weighting, at the time of multivalued conversion, by the zoom ratio.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for executing enlargement processing which changes the magnification of binary image data representing an image to any magnification and outputting binary image data having a different pixel density, comprising:

an input step of inputting binary image data;

an enlarging step of converting the binary image data of one pixel input in said input step into second binary image data comprising a plurality of sub-pixels, and enlarging the image, said enlarging step detecting a pattern of the input binary image data of plural pixels to decide a condition of the second binary image data comprising the plurality of sub-pixels so as to smooth edge portions of the image, in accordance with the detected pattern;

a multivalue-converting step of converting the second binary image data into multivalue image data;

a reduction step of executing thinning-out processing on the multivalue image data to convert the multivalue image data into reduced multivalued image data of any magnification; and a binary-value converting step of converting the reduced multivalued image data, which has been reduced in said reduction step, into binary image data, wherein said enlarging step includes inputting a discriminating signal indicating whether the binary image data of one pixel input in said input step is a character image or a halftone image, and in a case where the discriminating signal is a signal indicating the character image, the binary image data of one pixel is converted into second binary image data comprising a plurality of sub-pixels so as to smooth edge portions, or in a case where the discriminating signal is a signal indicating the halftone image, second binary image data of all sub-pixels is equalized to the input binary image data of one pixel on the pixel density.

2. The method according to claim 1, wherein said enlarging step includes performing contour smoothing by deciding densities of sub-pixels obtained by subdividing a pixel of interest in dependence upon densities of pixels peripheral to the pixel of interest, and enlarging the input binary image data by a factor of any integral number in one of a main scanning direction and a subordinate scanning direction.

3. An image processing apparatus for executing enlargement processing which changes the magnification of binary image data representing an image to any magnification and outputting binary image data having a different pixel density, comprising:

input means for inputting binary image data;

enlarging means for converting the binary image data of one pixel input by said input means into second binary image data comprising a plurality of sub-pixels, and enlarging the image, said enlarging means detecting a pattern of the input binary image data of plural pixels to decide a condition of the second binary image data comprising the plurality of sub-pixels so as to smooth edge portions of the image, in accordance with the detected pattern;

multivalue-converting means for converting the second binary image data into multivalued image data;

reduction means for executing thinning-out processing on the multivalued image data to produce reduced multivalued image data of any magnification; and binary-value converting means for converting the reduced multivalued image data into binary image data, wherein said enlarging means includes inputting a discriminating signal indicating whether the binary image data of one pixel input in said input means is a character image or a halftone image, and in a case where the discriminating signal is a signal indicating the character image, the binary image data of one pixel is converted into second binary image data comprising a plurality of sub-pixels so as to smooth edge portions, or in a case where the discriminating signal is a signal indicating the halftone image, second binary image data of all sub-pixels is equalized to the input binary image data of one pixel on the pixel density.

4. The apparatus according to claim 3, wherein said enlarging means performs contour smoothing by deciding densities of sub-pixels obtained by subdividing a pixel of interest in dependence upon densities of pixels peripheral to the pixel of interest, and enlarges the input binary image data by a factor of any integral number in one of the main scanning direction and a subordinate scanning direction.

5. An image processing apparatus to which binary image data comprising x pixels in a main scanning direction and y pixels in a subordinate scanning direction is inputted, converted into any size of X pixels in the main scanning direction and Y pixels in the subordinate scanning direction, and outputted as binary image data, comprising:

input means for inputting binary image data;

enlarging means for converting the binary image data of one pixel input by said input means into second binary image data comprising a plurality of sub-pixels, and enlarging the image, said enlarging means detecting a pattern of the input binary image data of plural pixels to decide a condition of the second binary image data comprising the plurality of sub-pixels so as to smooth edge portions of the image, in accordance with the detected pattern;

binary-to-multivalued density converting means for calculating multivalued densities, from binary image data of the pixel of interest and its peripheral pixels, of the second binary image data enlarged by a factor of an integral number by said enlarging means at the time of enlargement processing, and of the inputted binary image data at the time of reduction processing;

arbitrary magnification changing means for reducing, at arbitrary magnifications in the main and subordinate scanning directions, a size of image data of multivalued density converted by said binary-to-multivalued density converting means; and binarizing means for binarizing image data of multivalued density reduced by said arbitrary magnification changing means, wherein said enlarging means includes inputting a discriminating signal indicating whether the binary image data of one pixel input in said input means is a character image or a halftone image, and in a case where the discriminating signal is a signal indicating the character image, the binary image data of one pixel is converted into second binary image data comprising a plurality of sub-pixels so as to smooth edge portions, or in a case where the discriminating signal is a signal indicating the halftone image, second binary image data of all sub-pixels is equalized to the input binary image data of one pixel on the pixel density.

6. The apparatus according to claim 5, wherein said binary-to-multivalued density converting means changes window size and weighting of binary image data, which is referred to when a multivalue-conversion is performed, in dependence upon the ratio of change in image size.

7. The apparatus according to claim 5, wherein window size and weighting of binary image data referred to when a multivalue-conversion is performed is changed based upon whether the pixel of interest is contained in a character-image area or a pseudo-half-tone area.

* * * * *

UNITED STATES PATENT AND TRADEMARK OFFICE
CERTIFICATE OF CORRECTION

PATENT NO.  : 5,717,793

DATED       : February 10, 1998

INVENTOR(S) : KATSUTOSHI USHIDA ET AL.

It is certified that error appears in the above-identified patent and that said Letters Patent is hereby corrected as shown below:

On the title page, item

[30] FOREIGN APPLICATION PRIORITY DATA

"3-522211" should read --3-52211--.

COLUMN 11

Line 9, "described" should read --be described--.

COLUMN 14

Line 53, "the" (first occurrence) should be deleted.

COLUMN 17

Line 51, "pixels" should read --pixel--.

Signed and Sealed this

Twenty-first Day of July, 1998

Attest:

BRUCE LEHMAN

*Attesting Officer*         *Commissioner of Patents and Trademarks*